(12) United States Patent
Fujita et al.

(10) Patent No.: US 7,729,329 B2
(45) Date of Patent: Jun. 1, 2010

(54) SYSTEM, APPARATUS, METHOD, AND COMPUTER PROGRAM FOR RADIO COMMUNICATION USING A PREAMBLE PART OF A PACKET TO DETERMINE A COMMUNICATION CHANNEL

(75) Inventors: Chihiro Fujita, Kanagawa (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 881 days.

(21) Appl. No.: 11/172,917

(22) Filed: Jul. 5, 2005

(65) Prior Publication Data
US 2006/0025136 A1 Feb. 2, 2006

(30) Foreign Application Priority Data
Jul. 28, 2004 (JP) ............................. 2004-220856

(51) Int. Cl.
*H04B 7/216* (2006.01)
(52) U.S. Cl. ........................................ 370/342; 370/441
(58) Field of Classification Search ......... 375/130–136; 370/330, 436, 478
See application file for complete search history.

(56) References Cited

U.S. PATENT DOCUMENTS

| | | | |
|---|---|---|---|
| 4,752,939 A * | 6/1988 | Amoroso et al. | 375/134 |
| 5,953,368 A * | 9/1999 | Sanderford et al. | 375/141 |
| 6,594,248 B1 * | 7/2003 | Karna et al. | 370/342 |
| 6,779,009 B1 * | 8/2004 | Zuber | 708/422 |
| 6,888,876 B1 * | 5/2005 | Mason et al. | 375/132 |
| 2004/0228267 A1 * | 11/2004 | Agrawal et al. | 370/203 |
| 2004/0229639 A1 * | 11/2004 | Meyers et al. | 455/522 |
| 2005/0075118 A1 * | 4/2005 | Lewis et al. | 455/456.5 |

FOREIGN PATENT DOCUMENTS

| | | |
|---|---|---|
| JP | 08-181637 | 7/1996 |
| JP | 2001-136149 | 5/2001 |
| JP | 2001-313623 | 11/2001 |
| JP | 2003-348635 | 12/2003 |
| JP | 2003-348641 | 12/2003 |

* cited by examiner

*Primary Examiner*—Steven H Nguyen
*Assistant Examiner*—Alex Skripnikov
(74) *Attorney, Agent, or Firm*—Oblon, Spivak, McClelland, Maier & Neustadt, L.L.P.

(57) ABSTRACT

A radio communication system includes a plurality of radio communication stations. Each radio communication station performs a random-access operation in a communication environment having a plurality of available communication channels, and assigns a communication channel on a per packet basis to transmit a packet.

15 Claims, 11 Drawing Sheets

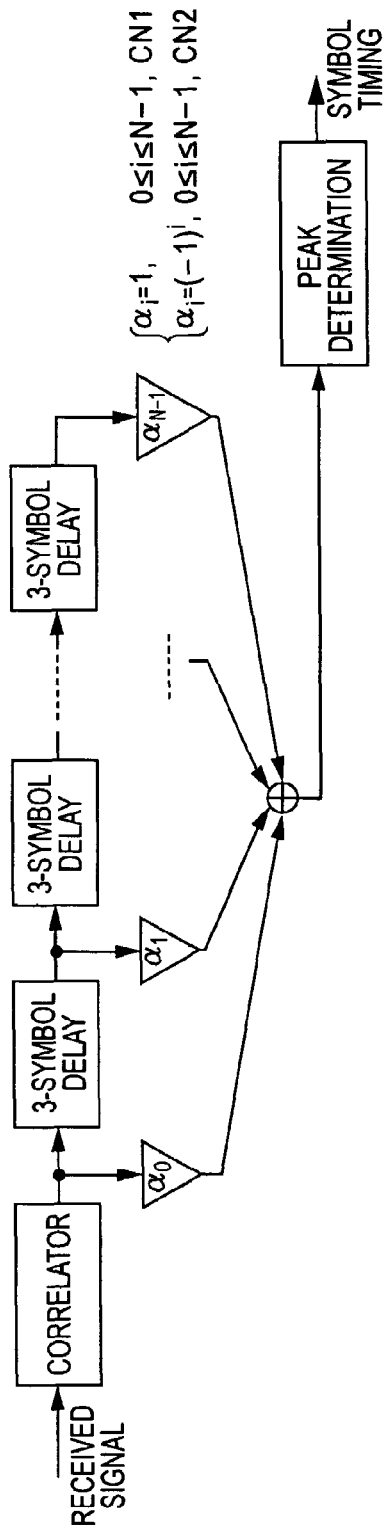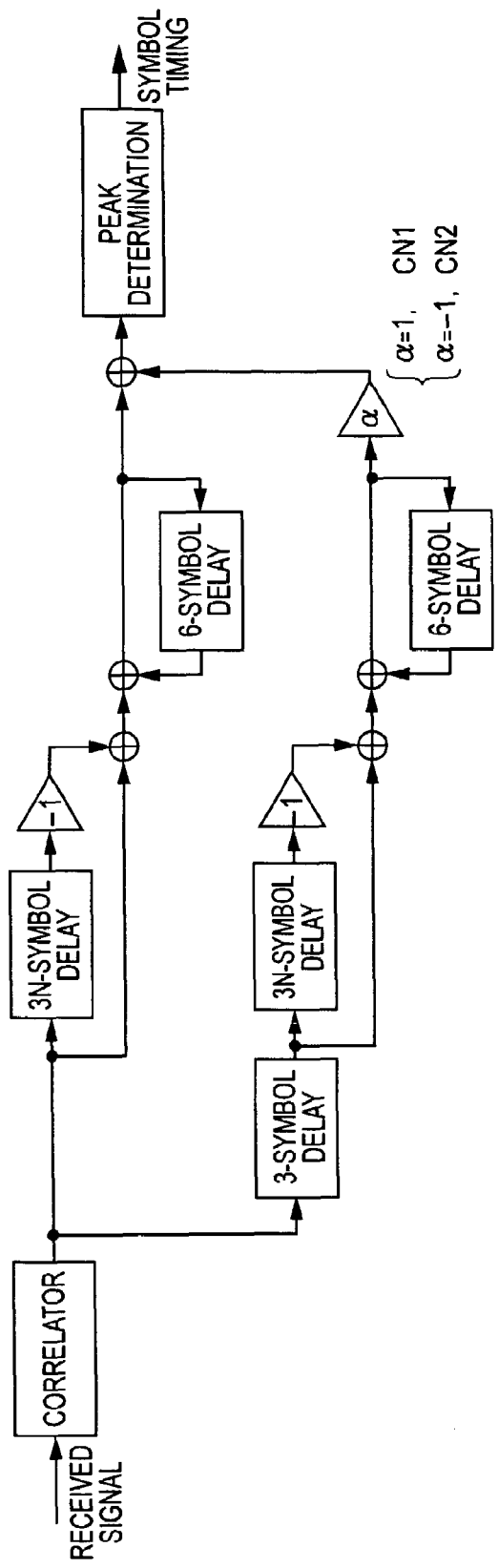

SYSTEM, APPARATUS, METHOD, AND COMPUTER PROGRAM FOR RADIO COMMUNICATION USING A PREAMBLE PART OF A PACKET TO DETERMINE A COMMUNICATION CHANNEL

CROSS REFERENCES TO RELATED APPLICATIONS

The present invention contains subject matter related to Japanese Patent Application JP 2004-220856 filed in the Japanese Patent Office on Jul. 28, 2004 the entire contents of which are incorporated herein by reference.

BACKGROUND OF THE INVENTION

1. Field of the Invention

The present invention relates to a radio communication system, a radio communication apparatus, a radio communication method, and a computer program for performing communications among a plurality of radio stations in a local area network (LAN) or a personal area network (PAN) and, in particularly, to a radio communication system, a radio communication apparatus, a radio communication method, and a computer program for constructing a radio network in which each communication station, free from a slave-master station relationship, performs, in an autonomous distributed manner, a random access operation such as carrier sense multiple access (CSMA) based on a carrier detection or media status monitoring.

The present invention also relates to a radio communication system, a radio communication apparatus, a radio communication method, and a computer program for constructing an autonomous distributed radio network without the intervention of a particular control station with nearby radio systems being free from mutual interference in a communication environment having a plurality of available communication channels. More specifically, the present invention relates to a radio communication system, a radio communication apparatus, a radio communication method, and a computer program for constructing a multi-channel autonomous distributed radio network in which each communication station dynamically and autonomously switches the communication channel in response to the usage status of the communication channel while workload on the network is minimized.

2. Description of the Related Art

Radio networks draw attention as a communication system that frees users from cable connection between devices. Since the radio network eliminates most of cable connection in office work space, communication terminals such as personal computers are relatively easily moved around in an office. With a high-speed and low-cost radio local-area network (LAN) system, the demand for such a system is mounting. A plurality of electronics are set up around individuals as a small scale radio network, namely, a personal area network (PAN). For example, frequency bands, such as a 2.4 GHz band and a 5 GHz band, each requiring no government license, may be specified for radio communication systems and radio communication apparatuses.

Typical standards of radio networks includes IEEE (the Institute of Electrical and Electronics Engineers) 802.11 (see International Standard ISO/IEC 8802-11:1999(E) ANSI/IEEE Std 802.11, 1999 Edition, Part 11: Wireless LAN Medium Access Control (MAC) and Physical Layer (PHY) Specifications), and Hiper LAN/2 (see ETSI Standard ETSITS101761-1V1.3.1 Broadband Radio Access Networks (BRAN); HIPERLAN Type 2; Data Link Control (DLC) Layer; Part 1; Basic Data Transport Functions), and ETSI TS101761-2V1.3.1 Broadband Radio Access Networks (BRAN); HIPERLAN Type 2; Data Link Control (DLC) Layer; Part 2: Radio Link Control (RLC) sublayer), IEEE802.15.3, and Bluetooth communication. Standards IEEE802.11 include various radio communication methods specified by IEEE802.11a, IEEE802.11b, etc., depending on radio communication method and frequency band in use.

To form a local area network based on radio communication techniques, a control station called an access point or a coordinator is typically arranged to generally control the network.

When a communication apparatus transmits information in a radio network having an access point, an access control method is widely used based on a reserved frequency band. In the access control method, a frequency band required to transmit information is reserved at the access point to use a transmission line that does not collide with information transmission of another communication apparatus. By arranging the access point, a synchronous radio communication is established to keep communication apparatuses synchronous with each other in a radio network.

If a transmitting communication apparatus and a receiving communication apparatus performs a non-synchronous communication in the radio communication system having the access point, the two apparatus must communicate with each other via the access point. This requirement reduces the usage efficiency of the transmission line.

An ad-hoc communication has been proposed as another technique for forming a radio network. In the ad-hoc communication, terminals directly communicate with each other in a non-synchronous manner. Particularly, the ad-hoc communication is appropriate as a small-scale radio network composed of a relatively small number of nearby clients, because terminals directly communicate with each other in a random fashion not via a particular access point in the ad-hoc communication.

The ad-hoc radio communication system, without central control station, is appropriate for use as a home network of home electronics. Even if one electronic apparatus is switched off or fails in the ad-hoc network, routing is automatically updated. The network is thus robust to damage, and data is transferred to relatively far distant location with a high data rate maintained by hopping a packet by several times among mobile terminals. A variety of ad-hoc systems are known as disclosed in the book entitled "Ad Hoc Mobile Wireless Network" authored by C. K. Tho, Prentice Hall PTR.

In an IEEE802.11 based radio LAN system, ad-hoc mobile terminals operating in an autonomous distributed peer-to-peer manner is available without the need for a control station. The IEEE802.11 networking is based on a concept of BSS (basic service set) and divided into two types. In one type, the BSS is defined by an infrastructure mode having a master such as an access point (AP). In the other type, and independent BSS (IBSS) is used and defined by an ad-hoc mode operating with a plurality of mobile terminals (MTs).

The infrastructure mode BSS requires an AP establishing coordination in a radio communication system. The AP integrates an coverage area surrounding own station into a BSS, which is also referred to as a "cell" in a cellular system. An MT near the AP is accommodated into a network as a BSS member. More specifically, the AP transmits a control signal called a beacon each time a target beacon transmit time (TBTT) comes at appropriate intervals. An MT that can receive the beacon recognizes the AP present nearby, and establishes connection with the AP. The MT near the AP receives the beacon, and is ready to recognize a next beacon transmit time by decoding an internal TBTT field. If it is not necessary to receive the beacon each time, the MT can enter a sleep state with power of a receiver switched off for the next TBTT or next several TBTTs.

In the ad-hoc mode IBSS, a plurality of MTs autonomously defines IBSS subsequent to negotiation. Once the IBSS is defined, the plurality of MTs determine TBTT at regular intervals. Upon recognizing the arrival of TBTT referencing own clock, each MT transmits a beacon if the MT recognizes after a random time of delay that no other MTs have transmitted the beacon. Any MT belonging to the IBSS transmits the beacon each time the TBTT comes.

The ad-hoc radio LAN network is known to be subject to the problem of hidden terminals. One station may be exposed to another station, but may be hidden from a third station. Two hidden stations are not able to negotiate with each other, and transmission operations thereof can collide with each other.

CSMA (carrier sense multiple access)/CA (collision avoidance) combined with an RTS/CTS procedure is known to overcome the hidden terminal problem. Standard IEEE802.11 also adopts this method.

In the CSMA (carrier sense multiple access), multi-access is performed based on carrier detection results. In radio communication, it is difficult for own apparatus to receive a signal from own apparatus. To avoid collision in SCMA/CA (collision avoidance) rather than in SCMA/CD (collision detection), own apparatus starts transmitting own information after checking that no information is transmitted from the other communication apparatuses. The CSMA is appropriate for non-synchronous data communication such as a file transfer or an electronic mail.

Carrier detection cannot be performed in an ultra-wide band (UWB) communication, in which one of an extremely short pulse wave having a pulsewidth of one nanosecond or shorter, a signal spread over a band width of several gigahertz, and a multi-carrier signal is used instead of a carrier in a very wide frequency band. By causing a communication station transmitting data to detect clear status of media, the same random access is performed.

In the RTS/CTS method, a communication station as a data source transmits a transmission request packet RTS (request to send), and starts transmitting data in response to the reception of a notification packet CTS (clear to send) from a communication station as a data destination. Upon receiving at least one of RTS and CTS, a hidden communication station avoids collision by setting, on own station, a transmission suspension period throughout which data transmission is expected in accordance with the RTS/CTS procedure. The hidden communication station, if viewed from a transmitting communication station, sets a transmission suspension period in response to the reception of a CTS to avoid collision with a data packet, and, if viewed from a receiving communication station, stops a transmission period in response to a RTS to avoid collision with an ACK (acknowledgement).

As described above, a network can be established in the ad-hoc mode without any intervention of a control station. But the ad-hoc mode is based on the premise that an IBSS is constructed of a plurality of MTs mutually communicable with each other. A plurality of networks independently operating using the same communication channel are subject to beacon collision or packet collision if communication coverage areas of the networks overlap each other subsequent to the shifting of one network or removal of a blocking object between networks, for example.

FIG. 15 illustrates networks independently operation in IBSS0 and IBSS1 modes, each network composed of three MTs. Even if these two networks use the same channel, no problem is expected because the radio wave of one network is unable to reach the other network. But if the communication coverage areas of two stations STA1 and STA2 overlap each other as a result of shifting of one network IBSS1 as shown in FIG. 16, the packets of the two MTs collide with each other. It is almost impossible to overcome this problem in the radio network having a single communication channel.

The multi-channel communication having a plurality of communication channels is thus introduced. When communication is interrupted by another system or when the spacing in the band becomes scarce because of an increase in the number of participating stations, a communication operation can be started by selecting a communication channel to be used. The network is thus continuously operated together with the other network in coexistence.

The multi-channel communication scheme is adopted in a high-speed radio PAN system of IEEE802.15.3. More specifically, in the adopted algorithm, a radio communication device scans a plurality of usable channels subsequent to power on, recognizes the presence or absence of a device transmitting a beacon signal as a piconet coordinator (PNC) therearound, and selects a frequency channel to be used.

As shown in FIG. 16, the IBSS1 now dynamically switches to a communication channel different from that of the IBSS0 in the network overlapping as shown in FIG. 16. Stations ST4 and ST3 are forced to switch to another communication channel although the two stations are free from interference from the MTs belonging to the IBSS0. More specifically, part of the network under interference causes the entire network to be channel switched. Negotiation involved in the channel switching increases, leading to a reduced throughput.

In the autonomous distributed type ad-hoc network having no control station, resource management of the communication channels is important to minimize mutual interference between radio networks operating nearby. To switch the frequency channel used in the entire network at a time, a representative station referred to as a coordinator or an access point needs to issue, to each terminal, a command indicating a channel in use. After all, it is difficult to switch the frequency channel in the ad-hoc network.

In the IEEE802.11 based LAN system, a network is formed using a frequency channel set by the access point. It is difficult to set up an ad-hoc network without arranging a base station. To communicate with a radio communication apparatus (terminal) belonging to an AP operating at another frequency channel, APs must be connected via a wired LAN cable, for example. Without any connection between the APs, the radio communication apparatuses (terminals) physically adjacent to each other, belonging to different APs, cannot communicate with each other.

In the IEEE802.15.3 high-speed radio PAN system, all frequency channels can be first scanned to search for a coordinator present nearby. Once an operation starts at a particular frequency channel, the usage status of another frequency channel cannot be learned. Even if a piconet at a different frequency channel is present nearby, communications with a radio communication apparatus connected to that piconet cannot be performed.

In the Bluetooth communication, a central control station called a master performs a frequency hopping operation in a random fashion, thereby evenly using frequency channels. The master serves as a standard for a hopping pattern of the frequency channels and synchronization of in time axis, and the presence of the master is essential in the construction of the network. If the master is missing, the network thus constructed is blocked, and a new master must be selected.

The known radio communication systems thus require complex mechanisms including timing for switching the frequency channel, a setup process, such as message exchanging, for participating terminals to start the frequency channel switching in synchronization with each other, and an arbitration process for frequency switching. To carry out self-contained control, the presence of the central control station such as the AP in the IEEE802.11 and HiperLAN/2 communications, and the master in the Bluetooth communication is required. If the central control station, such as the AP or the master, is missing, a protocol or an artificial update process for selecting a new central control station is required. Communications are suspended during such a process.

Network construction methods using a distributed beacon are disclosed as a step to overcome the problem of packet collision in response to a shifting network in Japanese Unexamined Patent Application Publication No. 2003-26457, for example.

In the autonomous distributed radio communication system free from a slave-master station relationship, each station transmits beacon information to notify other stations present nearby (within the communication coverage area) of the presence of own station while notifying the nearby stations of the network construction. Upon receiving a beacon signal, a communication station emerging in the communication coverage of a given station recognizes that own station enters another communication coverage. By reading information in the beacon, the emerging station recognizes the network and can participate in the network.

The stations, mildly time synchronized with each other at beacon transmission timing, performs transmission control utilizing effectively channel resources by means a transmission (MAC) frame permitting a time division multiple access. Each communication station performs a time-synchronized access such as autonomously reserving a frequency band, and setting a priority use period.

In the autonomous distributed network using a distributed beacon, each MT transmits a beacon with TBTTs unoverlapped. Information relating to beacon time of nearby MTs within the coverage area is described in the beacon so that the stations form a network having a beacon position not overlapping an adjacent MT. In other words, a mild IBSS is constructed with respect to each MT.

FIG. 17 illustrates a network that is autonomously constructed using a distributed beacon. If viewed from station STA1, the area represented by an broken-lined ellipse containing station STA4 is an IBSS, and if viewed from station STA5, the area represented by a dot-and-dash-chain-lined ellipse containing station STA3 is an IBSS.

In this way, the problem of hidden station is alleviated while response to the dynamic change in the network becomes possible. More specifically, only an MT having a beacon position overlapping another MT as a result of network shifting updates the beacon position TBTT of own station, and the problem of collision is thus overcome.

The dynamic network is thus constructed using the distributed beacon. However, the construction of the dynamic network is based on the premise that all MTs use the same channel, because the border of the network is different from MT to MT. To switch to another channel, all MTs must be switched in channel as in the ad-hoc mode of IEEE802.11.

Since all MTs use the same channel, and repeatedly use the same time point (slot) or the same band at predetermined transmission frame intervals, each MT is subject to interference from an MT unknown to own MT. If such interference becomes strong depending on radio-wave status, transmission and reception become impossible because predetermined SINR requirements are not satisfied even with a desired available slot.

Japanese Unexamined Patent Application Publication No. 2004-025506 discloses a technique to overcome this problem. In accordance with the disclosure, transmission power from own station is minimized to a level that satisfies the required SINR at a receiver side (transmission power control), and a signal coverage area is controlled by changing a threshold value for detecting a preamble on the receiver side in order to reduce interference (operation of the coverage area by modifying power control and threshold value). Since all MTs use the same channel, interference reduction efforts are subject to limitation depending on the number of communication stations accommodated in the channel.

In the network using the distributed beacon, one channel is divided into slots, each slot being a minimum unit assuring a frequency band for data transmission. A plurality of slots form a transmission frame period (namely, a super frame). Each MT transmits a beacon at each super frame and selects slots not overlapping any MT within an identified area (namely, to a next MT), as a beacon transmission position. Since the length of the super frame is fixed (in other words, the number of slots within the super frame is fixed), the maximum number of MTs that are allowed to participate in the network is equal to or less than the number of slots in the super frame, because of the minimum number of beacon intervals. Even if unused slots remain in the super frame, a new MT cannot participate in the network if the maximum number of MTs is already reached.

A plurality of networks can use different channels as shown in FIG. 18. Networks IBSS0 and IBSS1 using different channels are free from interference. A new STA6 now moves into the network in this communication environment. The newly participating station STA6 is located as shown in FIG. 19, and desires to communicate with both stations STA1 and STA5.

The station STA6 must participate in one of the networks IBSSs. To this end, the station STA6 participates in and then withdraws from each of the IBSS0 and IBSS1 or all MTs must be switched to the same channel. In the former case, the overhead between stations STA1 and STA6 and stations STA1 and STA6 increases. In the latter case, MTs not directly related must be switched to the new channel, and such an operation is otherwise unnecessary.

In the autonomous distributed network having a large number of MTs, the border of the network is different from MT to MT, and it is difficult to effectively share a plurality of channels in known channel assignment methods.

Japanese Unexamined Patent Application Publication Nos. 2003-281586 and 2003-315280 disclose communication systems that use a beacon transmission channel different from station to station, of the MTs belonging to the same network in a communication environment having a plurality of channels. In these disclosed communication systems, an ad-hoc network with interference level lowered is provided by selecting the transmission channel depending on the interference status of each channel.

In accordance with Japanese Unexamined Patent Application Publication No. 2003-281586, each communication station transmits a beacon in a channel appropriate for reception not overlapping the beacon of another station. A communication station having a priority transmission right subsequent to the beacon transmission shifts to a channel appropriate on the receiver side and starts transmission. Communications are thus performed at optimum interference level on the receiver side.

In accordance with Japanese Unexamined Patent Application Publication No. 2003-315280, each communication station determines an average level of interference each nearby station suffers from, and determines, as a transmission channel, a channel resulting in the lowest average interference level. Interferences of nearby stations having high priority with respect to own station are weighted averaged on a per channel basis. A channel resulting in the lowest level of interference the nearby stations suffer from is selected as a transmission channel. The throughput of the entire system is thus heightened.

Each communication station roams or persons frequently move as a radio wave blocking body. If a radio distributed communication system having a plurality of channels is used in such environments, propagation path varies frequently, leading to variations in a beacon transmission channel and a data communication channel. Each communication station frequently needs to scan beacons transmitted from other communication stations, leading to large communication overhead.

In communications using a plurality of channels, the scan operation must be repeated by the number of channels to scan beacons of the other communication stations. Overhead becomes larger than in the communication system using a single channel.

SUMMARY OF THE INVENTION

It is thus desirable to provide a radio communication system, a radio communication apparatus, a radio communication method, and a computer program for constructing a radio network in which each communication station, free from the slave-master station relationship, performs, in an autonomous distributed manner, a random access operation such as carrier sense multiple access (CSMA) based on a carrier detection or media status monitoring.

It is also desirable to provide a radio communication system, a radio communication apparatus, a radio communication method, and a computer program for constructing an autonomous distributed radio network without the intervention of a particular control station with nearby radio systems being free from mutual interference in a communication environment having a plurality of available communication channels.

It is further desirable to provide a radio communication system, a radio communication apparatus, a radio communication method, and a computer program for constructing a multi-channel autonomous distributed radio network in which each communication station dynamically and autonomously switches the communication channel in response to the usage status of the communication channel with workload on the network minimized.

In accordance with one embodiment of the present invention, a radio communication system includes a plurality of radio communication stations. The radio communication station performs a random-access operation in a communication environment having a plurality of available communication channels, and assigns a communication channel to a packet on a per packet basis to transmit the packet.

The word system here refers to a logical set of apparatuses (functional modules performing particular functions), and does not suggest whether one of the apparatus and the functional module is housed in a single casing.

In radio communication systems, a control station is typically arranged. A network is formed under the general control of the control station. A band reserve communication is performed under the control of the control station so that no information collision takes place. The intervention of the control station substantially reduces efficiency of transmission path. An autonomous distributed communication system that allows terminals to directly communicate with each other in non-synchronous fashion is thus developed.

If the same channel is used by a plurality of independent networks, beacon collision or packet collision may take place. For this reason, a multi-channel communication scheme is adopted to prepare a plurality of communication channels. If communication is interrupted by another system or if the spacing in the band becomes scarce because of an increase in the number of participating stations, a communication operation can be started by selecting a communication channel to be. The network is thus continuously operated together with the other network in coexistence.

To switch the frequency channel used in the entire network at a time, a representative station referred to as a coordinator or an access point needs to issue, to each terminal, a command indicating a channel in use. Resource management of the communication channels is important to minimize mutual interference between radio networks operating nearby in the autonomous distributed type ad-hoc network. Without the control station, it is difficult to switch the frequency channel in the ad-hoc network. Even in a system under the control of a control station, part of the network under interference causes the entire network to be channel switched. Negotiation involved in the channel switching increases, leading to a reduced throughput.

Typically in known multi-channel communication systems, a communication channel is formed of the same frequency channel or the code channel, and a single group of communication stations is thus assigned the same communication channel. In one embodiment of the present invention, the radio communication system assigns a communication channel on a per packet basis. A packet preamble pattern of a packet is constructed to permit a communication channel in use to be detected. Even if a transmitting station dynamically selects a channel on a per packet basis, a receiving station can keep track of the changing communication channel on a per packet basis. With the communication channel dynamically switched on a per packet basis, the number of available communication stations can be increased.

In the autonomous distributed radio communication system, each communication station is notified of beacon information. The stations, mutually notified of the network structure and mildly synchronized with each other, perform transmission control utilizing effectively channel resources by means a transmission (MAC) frame permitting a time division multiple access. In accordance with embodiments of the present invention, a station receiving the beacon and the packet, even without prior knowledge of a transmission channel, can keep track of channel switching. The stations are thus individually assigned a communication channel for use in packet transmission independent of a communication channel for use in beacon transmission.

When the communication channel is assigned on a per packet basis, the receiving station must keep track of the switching channel on a per packet basis even if the transmitting station dynamically selects the channel on a per packet basis. The transmitting station of one embodiment of the present invention may include identification information of the communication channel in the preamble part of the packet, and the receiving station may detect the preamble part to keep track of the communication channel on a per packet basis.

A radio network of one embodiment of the present invention may use the same frequency band, and a plurality of communication channels separated by a difference between spread codes. A multi-channel system is thus constructed.

The receiving station may determine, in parallel, a correlation value of the spread codes corresponding to the communication channels, detect a preamble based on a comparison of the correlation value with a threshold value, and determine a communication channel assigned to the received packet. The receiving station thus keeps track of the switching communication channel on a per packet basis.

A control channel for transmitting a preamble part of a packet and a data channel for transmitting a data part of the packet may be arranged in the radio network of one embodiment of the present invention. The control channel is in a single frequency band. The data channels are multi-channel formed of a plurality of frequency channels separated by a difference between frequency bands.

The transmitting station may transmit the data part of the packet in the data channel of a frequency band corresponding to the spread code that one-to-one corresponds to a frequency channel used in the data channel after transmitting, in the control channel, the preamble part in a preamble pattern spread by the spread code. The preamble pattern is determined by the spread code corresponding to the frequency channel. The receiving station may determine, in parallel, a correlation value between the preamble part of the packet in the control channel and the spread code corresponding to the frequency channel, and detects the spread code based on the comparison of the correlation value with a threshold value. The receiving station may keep track of the switching of the communication channel on a per packet basis. The receiving station may receive the data part of the packet in the data channel in a frequency band corresponding to the detected spread code.

In the radio communication system of one embodiment of the present invention, the communication channel may be defined by a unique hopping pattern that switches a plurality of usable, orthogonally separated channels every interval equal to one symbol or a plurality of symbols, and a plurality of communication channels may be separated by a difference in the hopping patterns of the plurality of orthogonally separated channels. A multi-channel is thus formed of the plurality of communication channels.

A communication channel is composed of a frequency hopping series. The orthogonally separated channels include but are not limited to the frequency channels separated by a frequency difference, a code channel orthogonally separated by spread code difference, and a spatial channel orthogonal in space. The channel separation method for hopping is not limited to any particular method.

In the radio communication apparatus that separates channels by a hopping pattern of the orthogonally separated channels, the station transmitting the packet transmits the preamble part of the packet in the same hopping pattern as the data part. The transmitting station transmits, in at least one orthogonally separated channel, a preamble pattern one-to-one corresponding to the hopping pattern so that the packet receiving station keeps track of the switching of the communication channel every packet (namely, the hopping pattern).

Rather than hopping the orthogonally separated channels in the preamble part, the communication station receiving the packet identifies the hopping pattern based on the preamble pattern obtained by receiving the preamble part in the one orthogonally separated channel. The receiving station receives and demodulates a subsequent data part by performing a hopping operation in the identified hopping pattern.

The packet transmitting communication station transmits, in the one orthogonally separated channel, a preamble pattern determined by the spread code one-to-one corresponding to the hopping pattern. The communication station receiving the packet determines in parallel a correlation value between the preamble pattern and the spread code corresponding to the hopping pattern, and detects the spread code based on the comparison of the correlation value with a threshold value. The communication station receives the data part of the packet in accordance with the hopping pattern corresponding to the detected spread code.

The communication station transmitting the packet determines the preamble pattern using the spread code common to all communication channels, and superimposes information identifying a communication channel onto the preamble pattern of each symbol in at least one orthogonally separated channel. Information can be superimposed using a phase modulation, such as BPSK (binary phase shift key). With this arrangement, a single correlator for spread code is sufficient on the receiving side. Separation of communication channels is accomplished by superimposing a signal on a preamble pattern. More specifically, the communication channels are separated by summing, in the one orthogonally separated channel, the correlation values between the preamble pattern of each symbol and the common spread code to separate the communication channels.

The radio communication apparatus may include a plurality of preamble detectors detecting the preamble part corresponding to each communication channel. A communication station receiving the packet causes the preamble detectors to operate in parallel, and initiates a packet receiving operation in a communication channel corresponding to the preamble part that has been detected first. If channel information of the received packet is not available, and if packets overlap each other, a packet that has been detected earlier is received.

When each communication station performs a random-access operation, the communication channel is switched on a per packet basis. The packet receiving station can thus keep track of the switching of the communication channel without prior knowledge of the transmission channel.

No negotiation is performed between stations in channel switching. The system is free from reduction in the system throughput. A larger number of communication stations is accommodated in the system while network collision is avoided. Since the packet receiving station identifies the communication channel by the preamble part of the packet, a scan operation to detect a channel the surrounding station uses to transmit the beacons signal is not required.

In the multi-channel communication apparatus of one embodiment of the present invention, the communication stations may select beforehand a communication channel to be used in each direction of communication. The communication channel can be switched beforehand based on information relating to available channels and the amount of interference on another communication channel. If a partner station, a communication channel and a band are predetermined, a communication channel receiving the packet can reduce the number of preamble detectors in use, and power consumption is reduced. Even in the communication environment where a plurality of networks using different communication channels are functioning, a new participating station operates flexibly by switching the communication channel in response to a target communication station of a network.

The communication stations may determine beforehand a communication channel and a band to be used. The communication station receiving the packet detects the preamble part in only the communication channel determined beforehand in the band determined beforehand.

The communication station transmitting the packet may perform transmission power control to transmit the packet at a minimum power satisfying a predetermined signal-to-interference plus noise ratio (SINR). The communication station receiving the packet may detect a desired packet by adjusting a threshold value in the detection of the preamble part, rather than detecting the preamble of an interfering packet. In this case, the predetermined SINR is more easily satisfied, and communications between station A and station B become possible. More specifically, the amount of interference involved in dynamic assignment of the communication channel is thus reduced.

A computer-readable program of one embodiment of the present invention for causing a computer to perform radio communications in a communication environment having a plurality of available communication channels, includes program code for performing steps of assigning a packet transmission communication channel on a per packet basis, transmitting, in the assigned communication channel, a packet with a preamble part attached thereto, the preamble part containing identification information of the assigned communication channel, detecting the preamble part of a received packet, and receiving a data part of the packet by switching to a communication channel for receiving the packet based on the detection results of the preamble part.

The computer program defines a predetermined computer-readable process to be performed on a computer system. The computer system with the computer program installed thereon operates as a radio communication apparatus. With a plurality of such radio communication apparatuses forming a radio network, the function of the above-described radio communication system is performed.

In accordance with embodiments of the present invention, a radio network is provided where the communication station, free from the slave-master station relationship, performs, in an autonomous distributed manner, a random access operation such as carrier sense multiple access (CSMA) based on a carrier detection or media status monitoring.

In accordance with embodiments of the present invention, an autonomous distributed radio network is constructed without the intervention of a particular control station with nearby radio systems being free from mutual interference in a communication environment having a plurality of available communication channels.

In accordance with embodiments of the present invention, a multi-channel autonomous distributed radio network is constructed in which each communication station dynamically and autonomously switches the communication channel in response to the usage status of the communication channel while workload on the network is minimized.

In accordance with embodiments of the present invention, a plurality of channels are shared in the autonomous distributed network, where network borders become ambiguous.

In accordance with embodiments of the present invention, the amount of interference is reduced by dynamically assigning the data transmission channel independent of the beacon transmission channel, based on the usage status of the channel and the amount of interference from the other channel.

In accordance with embodiments of the present invention, the problem of collision is overcome by switching a minimum number of stations in response to a dynamic variation in the network resulting from the shifting of networks or the participation of a new station. Unnecessary channel switching is thus avoided.

In accordance with embodiments of the present invention, the receiving station can keep track of the packet even if the transmitting station dynamically selects the channels on a per packet basis. This arrangement permits the number of communication stations to be increased.

In accordance with embodiments of the present invention, only the preamble part of the packet using a plurality of channels is transmitted in the same frequency channel, and the channel is identified by one of the code and the hopping pattern. The packets of the plurality of channels are easily detected. If the limitation that a plurality of beacons is not accommodated in the same slot among nearby stations are introduced in the distributed beacon system, it is sufficient to perform a scan operation for detecting the beacon on only a single channel.

In accordance with embodiments of the present invention, the communication station allows a plurality of detectors to detect a plurality of preamble patterns in parallel, a packet having the largest SINR is selectively received.

In accordance with embodiments of the present invention, even when packets of different channels collide in time sequence, any packet is selectively received at a satisfactory reception SINR level if the transmitting station notifies beforehand the receiving station of the channel and the slot.

These and other features, and advantages of the present invention will become apparent from the following description of the embodiments of the invention and the accompanying drawings.

BRIEF DESCRIPTION OF THE DRAWINGS

FIG. 7 illustrates the preamble detector in the receiver;

FIG. 8 illustrates the preamble detector in the receiver;

DESCRIPTION OF THE PREFERRED EMBODIMENTS

The embodiments of the present invention are described below with reference to the drawings.

In accordance with the present invention, radio wave is used as a communication path, and a network is constructed of a plurality of communication stations using a transmission medium of a plurality of communication channels, namely, a multi-channel. Communications are traffic of store-and-forward type. More specifically, information is transmitted in a packet.

In known multi-channel communication systems, a communication channel is the same frequency channel or a code channel, and a group of communication stations are typically assigned the same communication channel. In contrast, in accordance with a radio communication system of one embodiment of the present invention, the communication station is assigned a communication channel on a per packet basis, and the number of communication stations is thus increased.

In accordance with embodiments of the present invention, a preamble pattern of a packet is constructed to detect a communication channel in use. If a transmitting station dynamically selects the channel on a per packet basis, a receiving station also keeps track of the channel on a per packet basis as will be discussed later.

In a radio network of one embodiment of the present invention, each communication station transmits information in a random fashion in accordance with CSMA access procedure, and thus forms an autonomous distributed radio network system.

In an autonomous distributed radio communication system having no slave-master station relationship, each communication station transmits beacon information, thereby notifying other nearby communication stations within a coverage area of the presence of own station. The communication station also notifies the other communication stations of the network structure. A new communication station appearing in the communication coverage area receives the beacon signal, thereby detecting that the new communication station itself enters the communication coverage area. By reading information in the beacon signal, the new communication station recognizes the network, and can participate in the network.

In a radio network of one embodiment of the present invention, the communication stations are mildly time-synchronized by exchanging the beacon signal, and perform transmission control using effectively channel resources by means of a transmission (MAC) frame having a time-division multi-access structure. Each communication station autonomously operates and performs a time-synchronized access operation with nearby communication stations, such as reserving a frequency band to nearby stations and setting a priority use period.

The process of each communication station to be discussed below can be performed, in principle, by each of all member communication stations of a network. But depending on the case, not all member communication stations of the network can perform each of the following processes.

Figure 1:
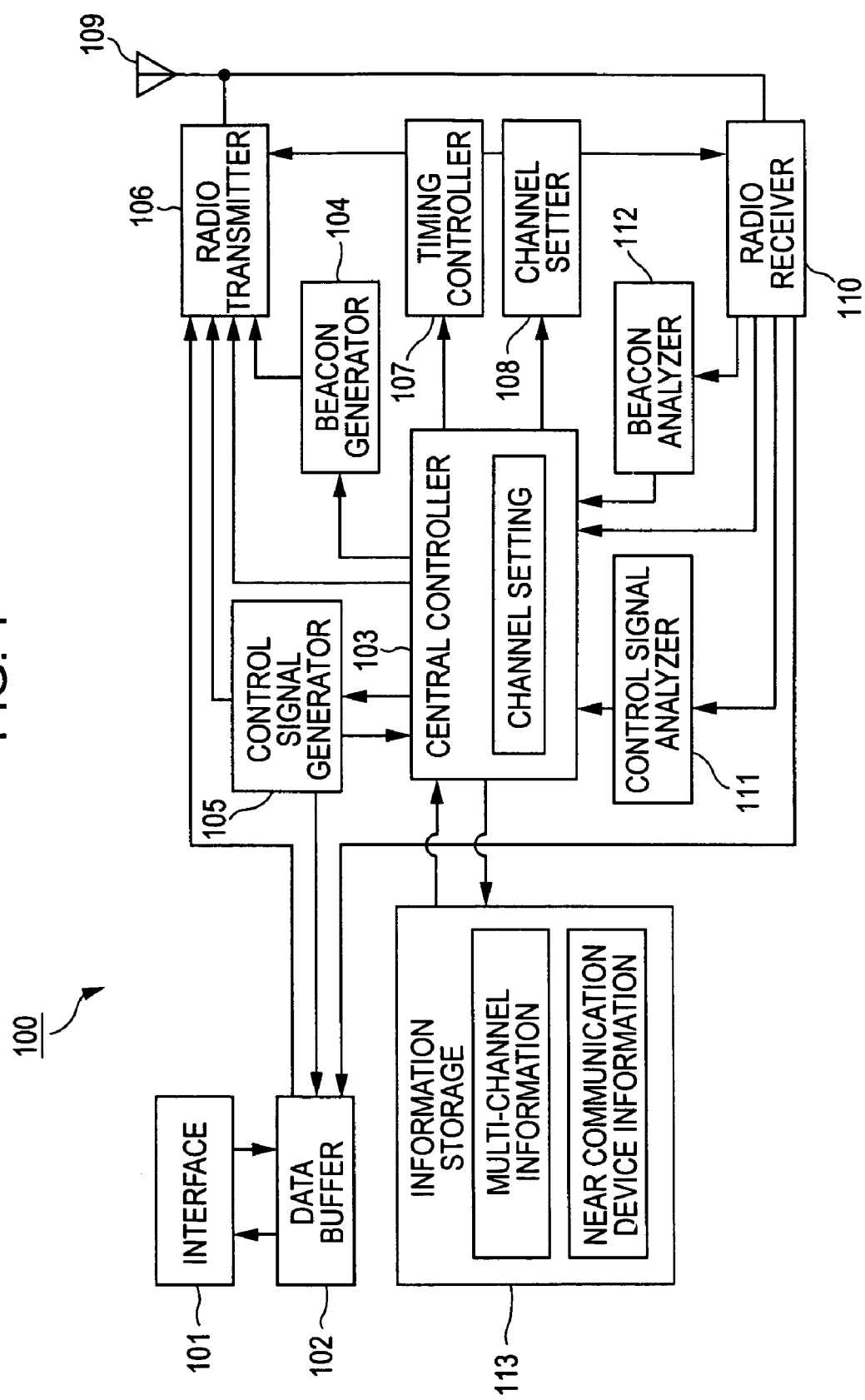
FIG. 1 is a functional block diagram illustrating a radio communication apparatus operating as a communication station in a radio network in accordance with one embodiment of the present invention.

FIG. 1 is a functional block diagram of a radio communication apparatus 100 that operates as a communication station in a radio network in accordance with one embodiment of the present invention. In a communication environment having a plurality of available communication channels, the radio communication apparatus 100 effectively performs channel accessing in the same radio system. Without interference with another radio system, the radio communication apparatus 100 thus forms an appropriate ad-hoc network.

The radio communication apparatus 100 includes an interface 101, a data buffer 102, a central controller 103, a beacon generator 104, a control signal generator 105, a radio transmitter 106, a timing controller 107, a channel setter 108, antenna 109, a radio receiver 110, a control signal analyzer 111, a beacon analyzer 112, and an information storage 113.

The interface 101 exchanges a variety of information with external apparatuses (not shown), such as personal computers, connected to the radio communication apparatus 100.

The data buffer 102 temporarily stores data transmitted from the external apparatus via the interface 101 or data received via radio communication path, before transmitting the data via the interface 101.

The central controller 103 generally controls the radio communication apparatus 100. More specifically, the central controller 103 manages information transmission and information reception of the radio communication apparatus 100, such as generation of a transmission packet and analysis of a received packet, and access control of the transmission path (including a scan setting operation and a channel setting operation in a multi-channel, a beacon reception operation, a data communication operation based on an RTS/CTS procedure).

The beacon generator 104 generates a beacon signal periodically exchanged with nearby radio communication apparatuses.

The control signal generator 105 generates control information, such as a request to send (RTS) signal and a clear to send (CTS) signal, as necessary prior to the transmission of data.

The antenna 109 transmits a signal on a radio wave in a selected channel to another radio communication apparatus, or receives a signal in a radio wave from another radio communication apparatus. In accordance with the present embodiment, the single antenna 109 arranged for both transmission and reception cannot operate in parallel concurrently. A plurality of communication channels cannot be handled at the same time.

The radio transmitter 106 includes a PHY unit (not shown) and a radio frequency (RF) unit (not shown). The PHY unit includes a modulator for modulating a transmission signal with a predetermined method, a unit for attaching a preamble part to a packet, a digital-to-analog converter for converting a digital transmission signal to an analog signal. The RF unit includes an up-converter for frequency up-converting the analog transmission signal, and a power amplifier for power amplifying the up-converted transmission signal. The radio transmitter 106 transmits data, temporarily stored in the data buffer 102, and the beacon signal at a predetermined transmission rate.

The radio receiver 110 includes an RF unit (not shown) and a PHY unit (not shown). The RF unit includes a low-noise amplifier (LNA) for voltage amplifying a signal received from another station via the antenna 109, a down-converter for frequency down-converting the received signal, and an AGC (automatic gain control) unit. The PHY unit includes an analog-to-digital converter for converting an analog signal into a digital signal, a detector for detecting a preamble of a packet, a synchronizer for achieving synchronization, a channel estimator, a demodulator for demodulating data with a predetermined demodulation method. The radio receiver 110 thus receives information and the beacon signal coming in from another radio communication apparatus at predetermined time.

Figure 2:
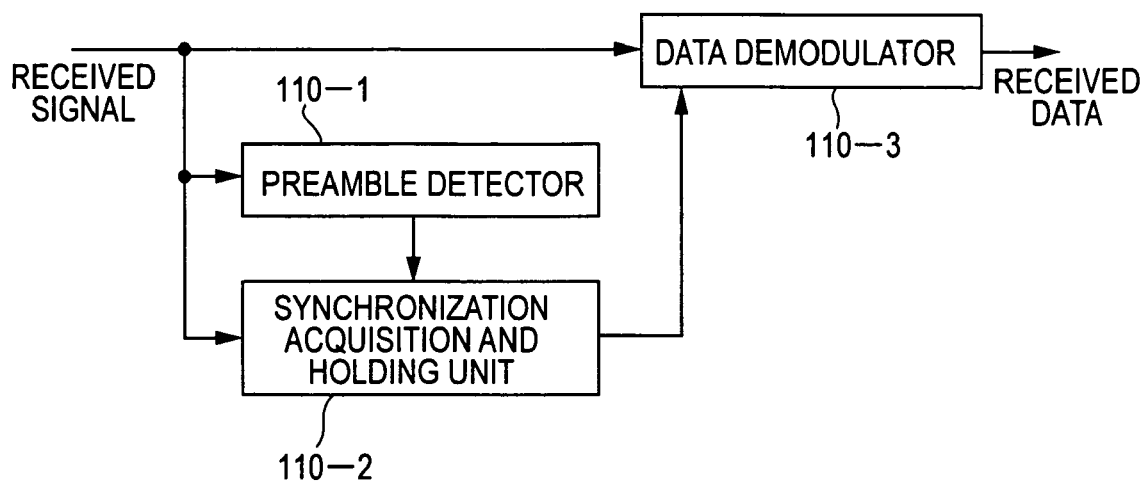
FIG. 2 is a functional block diagram of a radio receiver of FIG. 1.

FIG. 2 is a functional block diagram of the radio receiver 110. The radio receiver 110 includes a preamble detector 110-1, a synchronization acquisition and holding unit 110-2, and a data demodulator 110-3. The preamble detector 110-1 detects the preamble at the head of a receive frame. The synchronization acquisition and holding unit 110-2 acquires a synchronization signal of the receive frame based on the preamble detection results, and outputs the synchronization signal to the data demodulator 110-3. The data demodulator 110-3 demodulates the packet header and a portion subsequent to the header in accordance with the synchronization signal.

The transmission method of the radio transmitter 106 and the reception method of the radio receiver 110 can be any of a variety of communication schemes applicable to a radio network and appropriate for use in relatively near range communications. More specifically, one of ultra wide band (UWB), orthogonal frequency division multiplexing (OFDM), and code division multiple access (CDMA) may be used.

The timing controller 107 controls timing for transmitting and receiving radio signals. For example, the timing controller 107 controls beacon transmission timing from own station, beacon reception timing from a nearby station, a scan operation period in each communication channel, and transmission timing (inter frame space (IFS)) of each packet in the RTS/CTS procedure (RTS, CTS, data and ACK (acknowledgement)).

The channel setter 108 selects a communication channel in which a multi-channel radio signal is actually transmitted and received. In accordance with the present embodiment, the communication channel is switched on a per packet.

The control signal analyzer 111 analyzes the control signal, such as the RTS signal and the CTS signal, transmitted from a nearby radio communication apparatus.

The beacon analyzer 112 analyzes a beacon signal received from a nearby station to detect the presence of a nearby station, and stores, onto the information storage 113, acquired information as a result of analysis.

The information storage 113 stores information relating to an execution command for a series of access control operations to be executed by the central controller 103, multi-channel information relating to beacon transmission timing and beacon transmission channel of own station, and beacon transmission timing and beacon transmission channel of another station, and nearby apparatus information.

In accordance with embodiments of the present invention, the communication channel is assigned on a per packet basis. The preamble pattern of the packet is constructed so that the communication channel in use is detected. Even if a transmitting station dynamically selects the channel on a per packet basis, a receiving station keeps track of the channel on a per packet basis. The number of communication stations is increased by dynamically switching the communication channel on a per packet basis.

The communication channels are separated by code, for example. Since all communication channels use the same frequency band in this case, it is sufficient if the RF unit in the radio receiver 110 receives a single frequency band. The preamble detector 110-1 in the PHY unit prepares spread codes corresponding to all communication channels and includes correlators for the spread codes.

Figure 3:
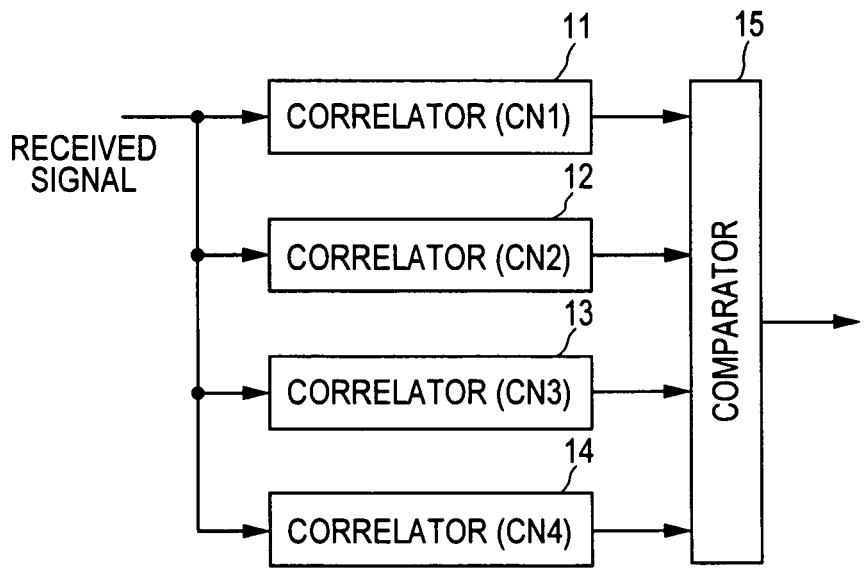
FIG. 3 illustrates the structure of a preamble detector with a communication channel discriminated by a spread code.

FIG. 3 illustrates the structure of the preamble detector 110-1. As shown, correlators 11-14 are arranged respectively for the communication channels CN1-CN4 that are separated by spread codes. The correlators 11-14 output correlation values between the received signal and the spread codes respectively assigned to the communication channels CN1-CN4. A comparator 15 compares the correlation values with a threshold value determined by the required SINR. If a correlation value is above the threshold value, a preamble is considered as being detected, and data demodulation starts.

If a spread code used in data subsequent to a header is identical to a spread code used in a preamble, the output of the correlator corresponding to the communication channel in use is used as is during data demodulation. In that case, the connection with the correlator, the operation of which is not required, is opened, and the comparison process of the comparator 15 is bypassed.

If the spread code corresponds to the channel, and the same frequency channel is used, the receiver becomes identical to a receiver circuit of M-ary SS method.

The communication channels are separated by frequency, for example. The structure of the preamble becomes more complex than when the communication channels are separated by code. A method of separating the control channel from the data channel and a method of using frequency hopping are described below.

A control channel used to transmit the preamble part of a packet and a data channel used to transmit the data part of the packet are arranged. A single frequency band is used for the control channel. The data channels are composed of a plurality of frequency channels that are separated by a difference between frequency bands in use.

Spread codes of the number identical to the number of data channels are prepared for the control channel, and each spread code one-to-one corresponds to the frequency band of the data channel. More specifically, a preamble pattern is determined by the spread codes that one-to-one correspond to the frequency channels used for the data channels.

From a packet transmitter side, the preamble part of the packet is transmitted in the control channel and the data part of the packet subsequent to the preamble part is transmitted in the data channel corresponding to the spread code of the preamble. The channel switching between the preamble part and the data part is performed using the same technique as the frequency hopping spread spectrum.

Figure 4:
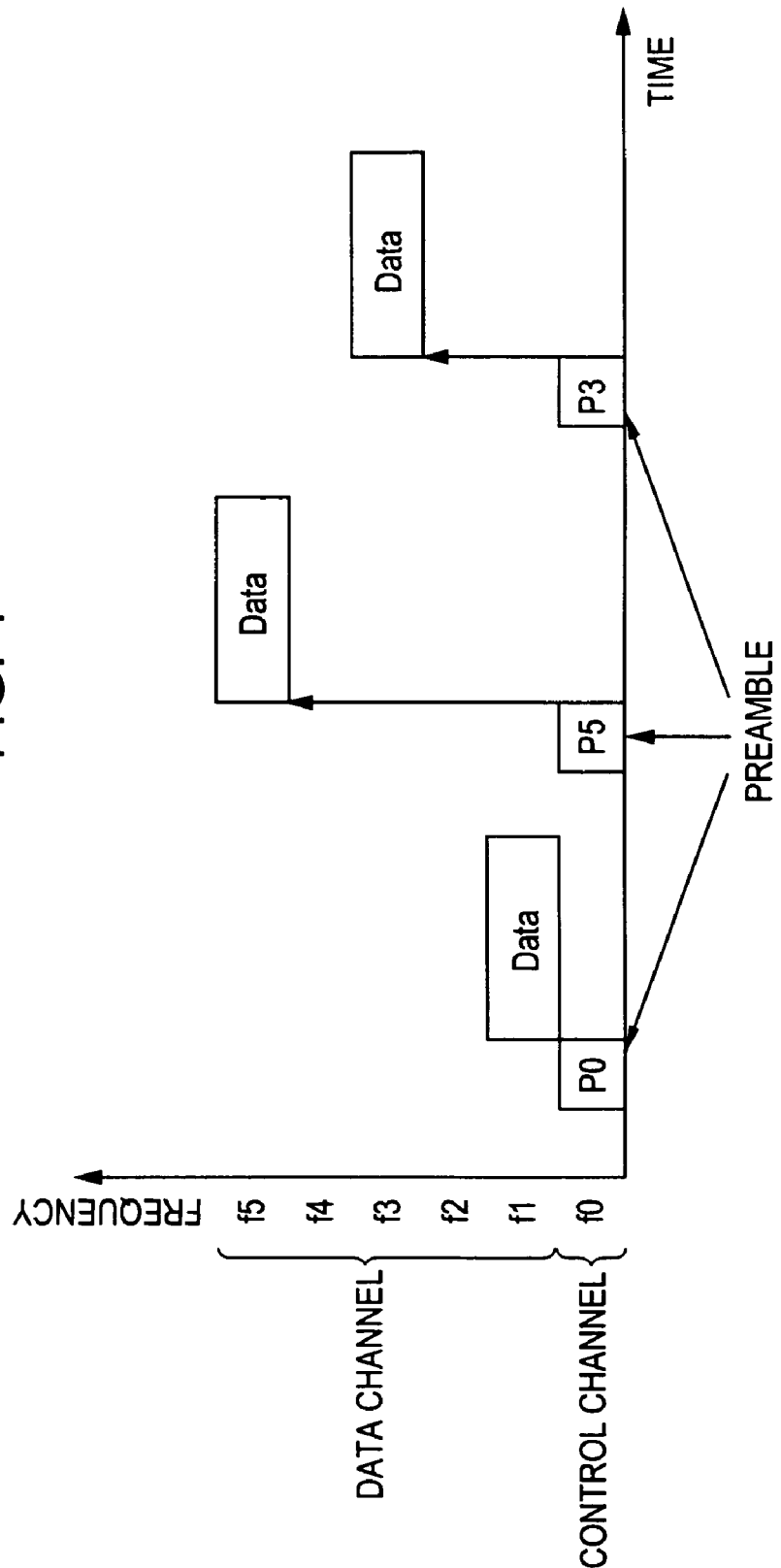
FIG. 4 illustrates a channel switching operation in a preamble part and a data part of a packet.

FIG. 4 illustrates the channel switching between the preamble part and the data part. As shown, the control channel uses frequency band f0, and the data channels are a plurality of frequency channels f1 through f5 separated by frequency band difference. Three packets are successively transmitted in time sequence, and the preamble parts of the three packets are transmitted in the control channel f0. The preamble parts have the preamble patterns that are spread using the spread codes P0, P5, and P3 one-to-one corresponding to the frequency channels in which the subsequent data parts are transmitted.

The transmitting station transmits the data part of the packet in the data channel as the frequency channel corresponding to the spread code after transmitting the preamble pattern determined by the spread code one-to-one corresponding to the frequency channel used in the data channel. In response, the receiving station determines, in parallel, the correlation value between the received preamble pattern and the spread code corresponding to the frequency channel. Based on the comparison of the correlation value with a threshold value, the receiving station detects the spread code, and receives the data part of the packet in the frequency channel corresponding to the detected spread code.

The preamble detector 110-1 in the radio receiver 110 is implemented in the circuit of FIG. 3. The correlator is arranged for each of the communication channels separated by spread code. Each correlator outputs a correlation value between the received signal and the spread code assigned to the respective channel. The comparator compares the correlation value with the threshold determined by the required SINR. If the correlation value is above the threshold value, a preamble is determined as being detected, and data demodulation starts.

The accuracy level of reception timing is heightened by using, for the preamble, high auto-correlation series, such as M series. Based on the timing, a frequency hopping operation is performed to demodulate the data part. Even if different preambles overlap each other as a result of selecting a high correlation preamble pattern, the preamble is detected in a manner free from a high degree of interference.

In accordance with embodiments of the present invention, the number of communication channels is increased by dynamically switching the communication channel on a per packet basis. In the above-described method, a single communication channel is composed of the same frequency channels or code channels, and within a packet, a single channel separated by frequency or spread code is used.

In accordance with the present embodiment, each communication channel is defined by a unique hopping pattern that switches the orthogonally separated channel on a per symbol basis. The difference in hopping pattern causes a plurality of communication channels, namely, a plurality of orthogonally separated channels. For example, the orthogonally separated channels herein include frequency channels different in frequency bands, code channels orthogonally separated by spread code difference, and spatially orthogonal spatial channels. Channel separation to perform a hopping operation is not limited to any particular method.

In MB-OFDM (Multi-Band OFDM) as a candidate for IEEE802.15.3, channels separated by a frequency hopping pattern (TF code) are considered (see 15-03-0268-03-003a-Multi-band-CFP-Document.pdf, which is available online at the Multibandofdm organization's website).

Figure 5:
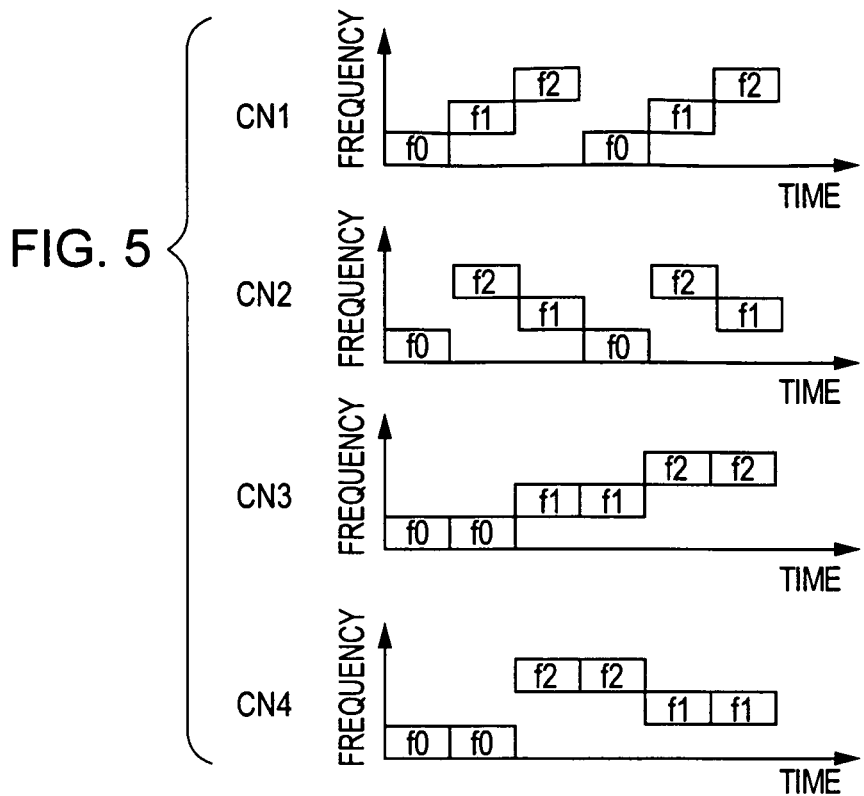
FIG. 5 illustrates a multi-channel composed of a frequency hopping series.

FIG. 5 illustrates a multi-channel constructed of a frequency hopping series. As shown, four channels CN1-CN4 are separated by a hopping pattern formed of three frequency bands f0-f2. A hopping operation is performed on a per symbol basis, and one period constructed of six symbols is used as a hopping pattern. The communication channel CN1 is separated by a hopping pattern that switches the frequency bands in the order of f0, f1, and f2 on a per symbol basis. The communication channel CN2 is separated by a hopping pattern that switches the frequency bands in the order of f0, f2, and f1 on a per symbol basis. The communication channel CN3 is separated by a hopping pattern that switches the frequency bands in the order of f0, f0, f1, f1, f2 and f2 on a per symbol basis. The communication channel CN4 is separated by a hopping pattern that switches the frequency bands in the order of f0, f0, f2, f2, f1, and f1 on a per symbol basis.

The packet transmitting station transmits the preamble part and the data part in the packet in accordance with the hopping pattern defined by the communication channels. The packet transmitting station transmits the preamble pattern one-to-one corresponding to the hopping pattern on a single basic frequency channel (such the frequency f0 in FIG. 5) so that the packet receiving station keeps track of the switching of the communication channel on a per packet basis (namely, a hopping pattern). Free from the need to hop the frequency channels for the preamble part, the packet receiving station receives the preamble part in the basic frequency channel, and identifies the hopping pattern based on the acquired preamble pattern. The packet receiving station performs the hopping operation on the subsequent data part in accordance with the identified hopping pattern, thereby receiving and demodulating the data.

In the previously discussed MB-OFDM method, the preamble pattern one-to-one corresponds to the hopping pattern.

Two examples of constructing the preamble pattern one-to-one corresponding to the hopping pattern are described below. In a first example, the preamble is assigned the spread code corresponding to each channel, and is adopted in the MB-OFDM method.

The packet transmitting station transmits, in one orthogonally separated channel, the preamble pattern determined by the spread code one-to-one corresponding to the hopping pattern. In response, the packet receiving station determines, in parallel, the correlation value of the received signal with the spread code corresponding to the hopping pattern on the basic frequency band f0, detects the spread code on the comparison of the correlation value with the threshold value, and performs the hopping operation on the subsequent data part in accordance with the detected spread code. The packet receiving station thus receives and demodulates the data part.

The hopping pattern is detected using the preamble detector of FIG. 3 in the same manner as in the operation in which a multi-channel is constructed of channels separated by spread codes. The correlator is arranged for each spread code one-to-one corresponding to the hopping pattern and outputs the correlation value between the input signal and the spread code assigned to each communication channel. The comparator compares the correlation value with the threshold value determined by the required SIRN value. If the correlation value is above the threshold value, the preamble is determined as being detected, and data demodulation starts. If the preamble is constructed of a plurality of symbols, the correlation values are summed over all symbols. This determination results are reliable. However, a summing operation responsive to the hopping pattern is required.

A second example of the preamble pattern is described below. The preamble pattern corresponding to the spread code is single and common to all communication channels. In this arrangement, the number of correlators of the spread code to be prepared in the receiver side is one. The separation of the communication channels is performed by superimposing a signal onto the preamble pattern.

Figure 6:
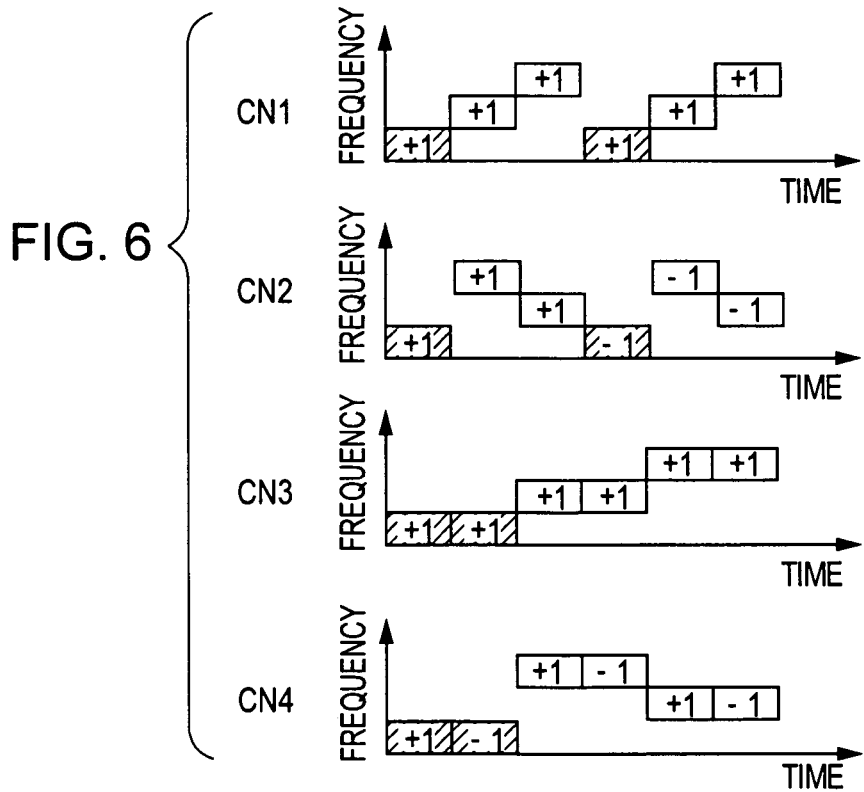
FIG. 6 illustrates a preamble pattern composed of a single spread code.

FIG. 6 illustrates the preamble pattern constructed of a single spread code. As shown, a preamble is detected by a hatched single frequency (a frequency band f0 as shown in FIG. 6, for example). A hopping pattern with one period having six symbols is used with a hopping operation and is performed on a per symbol basis. There are two symbols that hop to the frequency band f0 in one period. To discriminate CN1 from CN2 and CN3 from CN4, information 1 is superimposed on the spread code in CN1 and CN3, and information 1 and information −1 are superimposed on two symbols in CN2 and CN4. To superimpose information, BPSK (binary phase shift keying) can be used.

FIG. 7 illustrates a preamble detector in the receiver. The preamble detector is designed to detect the preambles for CN1 and CN2 among the preamble patterns of FIG. 6. Herein, N represents a quotient of the number of preamble symbols to be summed, divided by the number 3. A signal is received on a frequency band f0 using a correlator of a common spread code. Since the communication channels CN1 and CN2 use frequency band f0 every three symbols, the correlation values are summed with a delay line with a tap every three symbols. The results are subjected to peak determination to recognize the presence of the signal, and the symbol timing is thus determined. The peak determination depends on the construction method of the preamble pattern, and includes a threshold determination method using the SINR. As shown, the output of the correlator is inverted every three-symbol delay before summing in the communication channel CN2. The preamble detector of FIG. 7 may also be constructed as shown in FIG. 8.

The preamble detectors corresponding to the communication channels CN3 and CN4 are constructed by modifying parameters of tapped delay lines as shown in FIGS. 7 and 8. The tapping is designed so that first two symbols of consecutive six symbols are extracted and summed.

Figure 9:
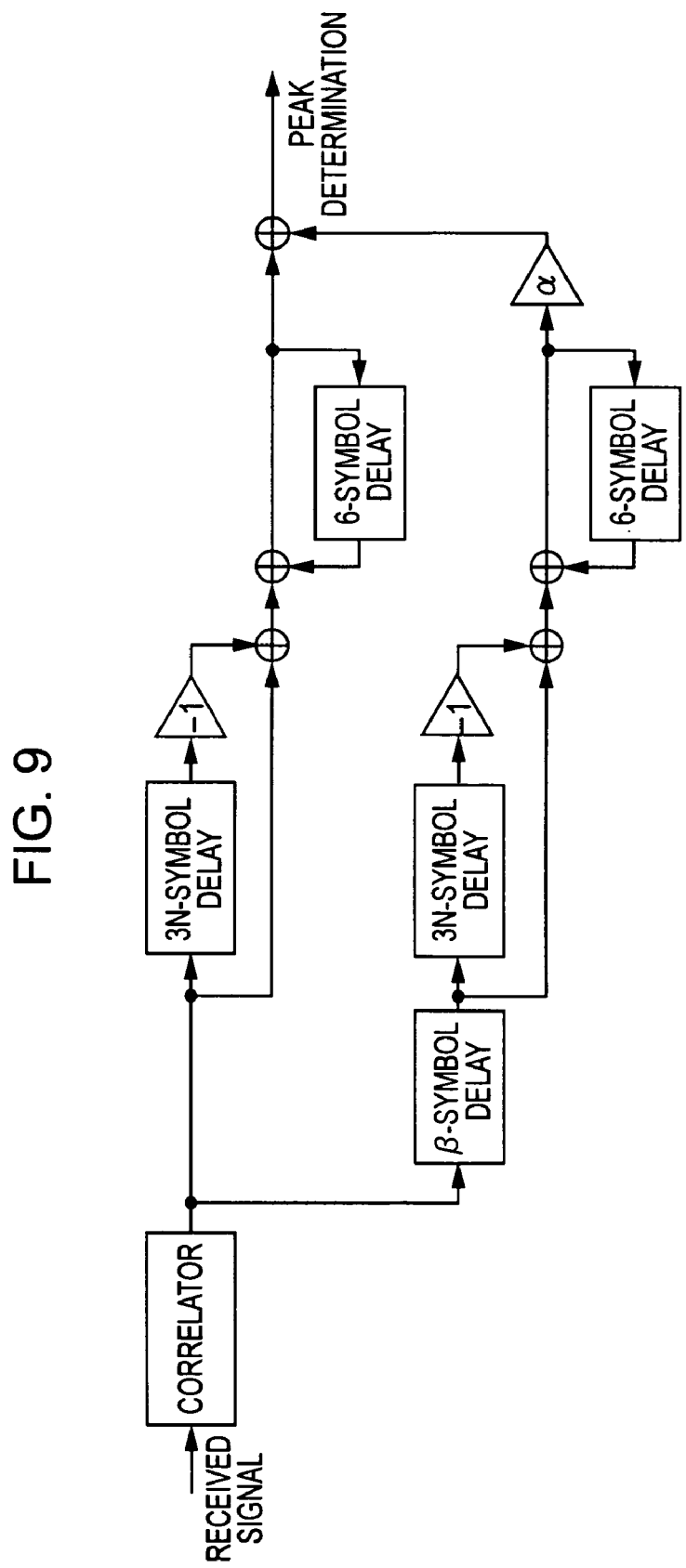
FIG. 9 illustrates the preamble detector in the receiver.

FIG. 9 illustrates the preamble detector corresponding to a single communication channel in a generalized configuration. The preamble detector can work with any of the communication channels CN1-CN4 of FIG. 6 by determining parameters $\alpha$ and $\beta$ as listed in Table below.

| Channel | $\alpha$ | $\beta$ |
|---------|----|----|
| CN1 | 1 | 3 |
| CN2 | −1 | 3 |
| CN3 | 1 | 1 |
| CN4 | −1 | 1 |

Each receiver includes the preamble detectors of FIGS. 7 through 9 of the number equal to the number of communication channels. By operating the preamble detectors in parallel, the packet is received using the communication channels.

Figure 10:
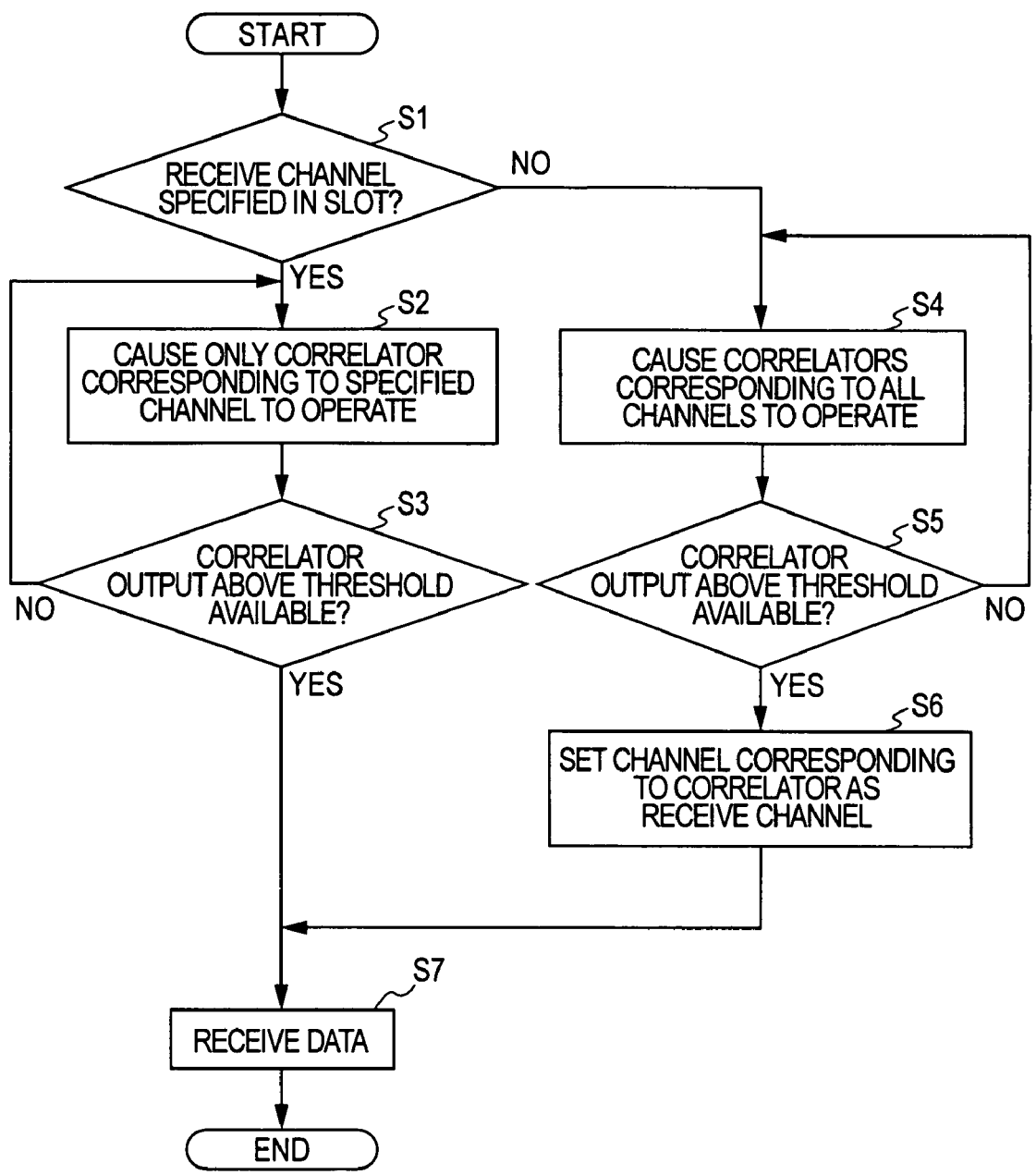
FIG. 10 is a flowchart of a receiving operation for keeping track of data transmission where a plurality of correlators are operated to switch the communication channel on a per packet basis.

FIG. 10 is a flowchart of a reception operation in which a plurality of correlators operate to keep track of the communication channel changing on a per packet basis in data transmission. The data transmission is performed on a per slot. Each slot corresponds to unit time.

It is determined in step S1 whether a communication channel is specified in the current slot.

If it is determined that a communication channel is specified, only a correlator corresponding to the specified channel is operated. If none of the outputs of the correlators are above a threshold (step S3), processing returns to step S2.

If it is determined in step S1 that no communication channel is specified, the correlators corresponding to all communication channels are operated in parallel (step S4), and it is determined in step S5 whether the output of any correlator is above the threshold. If it is determined that none of the outputs of the correlators is above the threshold, processing returns to step S4. If it is determined in step S5 that the output of any correlator is above the threshold value, the corresponding communication channel is set up as a receiving channel (step S6).

The data part of the packet is received in the receiving channel set up in step S2 or S6 (step S7).

A plurality of packets transmitted in different communication channels may overlap each other in time sequence when the packets are received. A reception operation in that case is described below.

Figure 11:
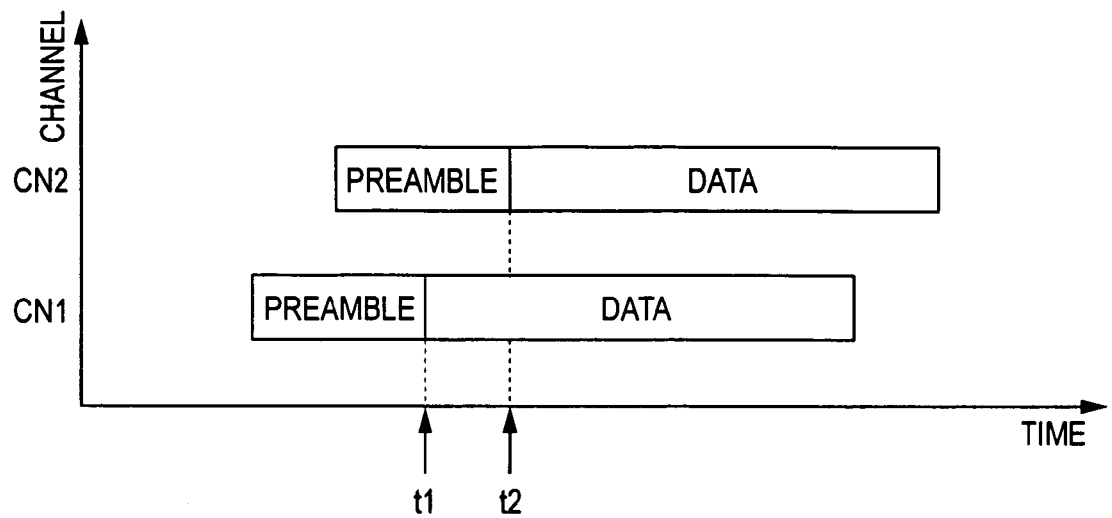
FIG. 11 illustrates packets that have arrived via communication channels in a time-overlapping manner.

FIG. 11 illustrates packets from the communication channels CN1 and CN2 arriving at a communication station in time overlapping manner. The preamble part on the channel CN1 arrives earlier, and the data part arrives at time t1 on the communication channel CN1 and the data part arrives at time t2 on the communication channel CN2.

The preamble detectors corresponding to all communication channels are operating in the communication station receiving the packet. If the two packets do not overlap each other, the packet on the communication channel CN1 is detected at time t1, and the packet on the communication channel CN2 is detected at time t2. If the packet is detected, the preamble detector stops operating, and the reception of the data part starts on the corresponding communication channel.

If the packets of the communication channels CN1 and CN2 are above the threshold values of the preamble detectors, the preamble part of the transmission packet in the communication channel CN1 is detected at time t1, and the reception operation of the data part of the packet in the communication channel CN1 starts. In this case, the preamble detector is already inoperative at time t2, and the packet transmitted on the communication channel CN2 is not received.

If the output of the preamble detector in the communication channel CN1 is not above the threshold value, the reception operation of the data part on the communication channel CN1 is aborted. When the preamble transmitted later on the communication channel CN2 is detected, the reception operation of the data part of the packet starts on the communication channel CN2.

If received packets are overlapping with information of thereof unknown in this way, a packet detected earlier is received.

Each communication station shares network information with nearby stations by notifying the nearby communication stations of the beacon information in the autonomous distributed radio communication system having no slave-master station relationship. The communication stations, mildly time synchronized at the beacon transmission timing, perform the transmission control process using effectively the channel resources by means of the transmission (MAC) frame having the time division multi-access structure. The autonomous distributed network using the distributed beacon is employed herein.

In the multi-channel system having a plurality of communication channels, a single communication station uses a plurality of communication channels. A channel receiving a beacon may be different from a channel receiving a data packet. In accordance with embodiments of the present invention, it is permitted for each communication station to select the channel for transmitting the beacon independent of the channel for transmitting the data packet. The selection method of selecting a channel for beacon is described below.

In a first method, a channel used to transmit the beacon most frequently is used as a beacon transmission channel. If the number of communication stations in a single communication channel fails to reach the maximum number of participating communication stations, all communication stations can use the channel as the beacon transmission channel. For example, to receive only the beacon in a power saving mode, the number of operating correlators can be one. This arrangement leads power a saving operation.

In a second method, on the contrary, a channel used to transmit the beacon least frequently is used as the beacon transmission channel. Since the number of beacons per communication channel is reduced, each communication station can easily continuously hold a single communication channel. This feature is appropriate for streaming transmission of moving images, or other applications where a frequency band needs to be continuously maintained.

In a third method, own communication station uses the same channel as the beacon transmission channel of a communication station own communication station desires to communicate with. In accordance with the third method, as with the first method, the number of preamble detectors in use is reduced.

In a fourth method, the channel is randomly selected regardless of the current channel status.

In any of the above-referenced methods, once the beacon transmission channel is determined, the usage status of that channel is scanned and intermediate time of the time slot having the longest beacon interval is set as a beacon transmitting time. The beacon transmission channel may be switched in response to the shifting of the network and the participation of a new communication station.

In accordance with embodiments of the present invention, the transmission channel is flexibly selected on a per packet basis. Unlike the known system that uses a fixed communication channel, the transmitting station is free from clarifying a channel coverage (such as a cell in the cellular system) and the channel is used in a spatially periodically repeated manner. Since the receiving station is unable to predict the channel in which a packet intended to own station is transmitted, the preamble detectors on all communication channels need to be operated. This is not preferable from the standpoint of power saving. A transmission and reception method discussed below notifies beforehand the receiver side of the transmission channel and uses the determined transmission channel.

Figure 12:
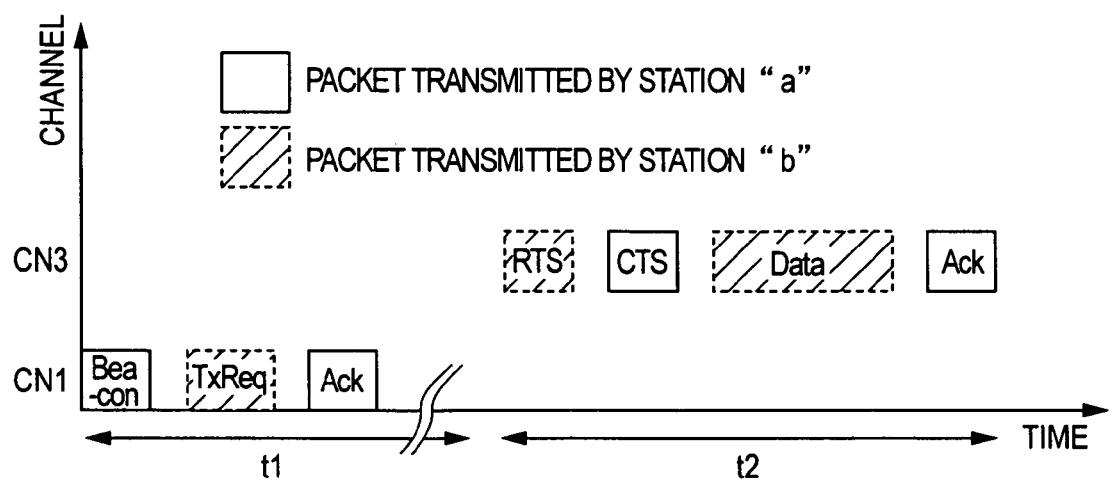
FIG. 12 illustrates a packet transmission procedure in response to a transmission channel prior notice.

FIG. 12 illustrates the operational procedure of transmitting the packet after prior notice of the transmission channel. As shown, station "a" uses the communication channel CN1 as the beacon transmission channel. Station "b" transmits a packet to station "a".

Upon receiving the beacon from the station "a", the station "b" transmits a transmission request packet (TxReq) in the communication channel CN1 as the beacon channel within constant time period t1. Herein, throughout time period t1, the station "a" performs the reception operation, and any packet intended for the station "a" and arriving within time period t1 is received by the station "a". During time period t1, the station "a" simply operates only the preamble detector corresponding to the communication channel CN1.

The transmission request packet (TxReq) contains information relating to channel occupancy time of a transmission packet, a communication channel in use, and a slot in use (band in use). To accept the packet, the station "a" transmits an Ask packet in the communication channel CN1.

The station "a" and the station "b" share time period t2 for transmission and reception and a data channel (CN3), and are ready to transmit and receive data in a correct way. The communication channel is switched beforehand in response to channel availability information and information relating to the amount of interference from the other channel.

To overcome the hidden terminal problem in the communication channel CN3 between the station "a" and the station "b", a frequency band is reserved in accordance with the RTS/CTS procedure, and the data packet is then transmitted. The present invention is not limited to this method. For example, the data packet may be transmitted and received on the shared communication channel CN3 in accordance with the CSMA procedure.

The channel to be used is known in time period t2 for data transmission and reception. The station "a" and the station "b" simply cause the preamble detector corresponding to the communication channel CN3 to operate. Even if the packet transmitted from another station overlaps a desired packet, only the desired packet is detected and received.

As shown in FIG. 12, the transmission request packet (TxReq) is separated from the transmission request packet RTS in the RTS/CTS procedure. Since the transmission request packet (TxReq) substantially serves RTS, and Ack within time period t1 substantially serves as CTS, the transmission and reception of RTS and CTS within time period t2 may be omitted. A band is reserved beforehand in the communication channel CN3, the information relating to the reserved band is transmitted in the beacon, and the transmission request packet (TxReq) and Ack in time period t1 are thus omitted. In this way, overhead involved in the transmission and reception of the packet is reduced, leading to an increase in throughput.

In the multi-channel system of the present embodiment, the transmitting station can select the communication channel on a per packet basis. The transmission method on the data transmission channel is described below.

Figure 13A:
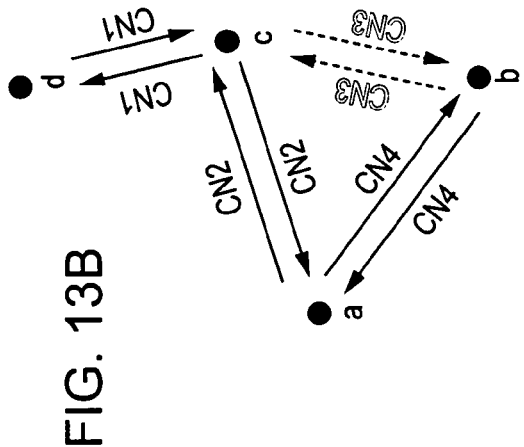
FIGS. 13A and 13B diagrammatically illustrate the assignment of a transmission communication channel for use by each communication station.
Figure 13B:
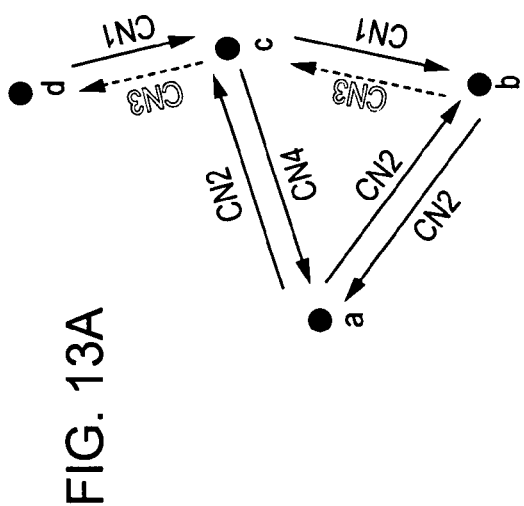

FIGS. 13A and 13B diagrammatically illustrate communication stations that assign communication channels for use in transmission. As shown, solid circles represent MT (mobile terminals) and arrow-headed lines connecting MTs represent the communication channel and the direction of data packet transmission. Number labeling CNs represent identification numbers of communication channels for data communication.

FIG. 13A illustrates a transmission method of the data transmission channel in which a single communication channel is used for a communication partner and a communication direction. FIG. 13B illustrates a second transmission method in which a single communication channel is used for two-way communication between a pair of communication channels. If the communication partner and the communication channel are determined beforehand in this way, the number of preamble detectors to be operated can be reduced, and power consumption is reduced accordingly.

The communication channel may be selected according to one of the following criteria: the least frequently used as in the beacon channel selection, the same channel as the beacon channel, a channel resulting in the lowest interference power, a channel providing the largest number of consecutive empty slots, and a randomly selected channel.

Figure 19:
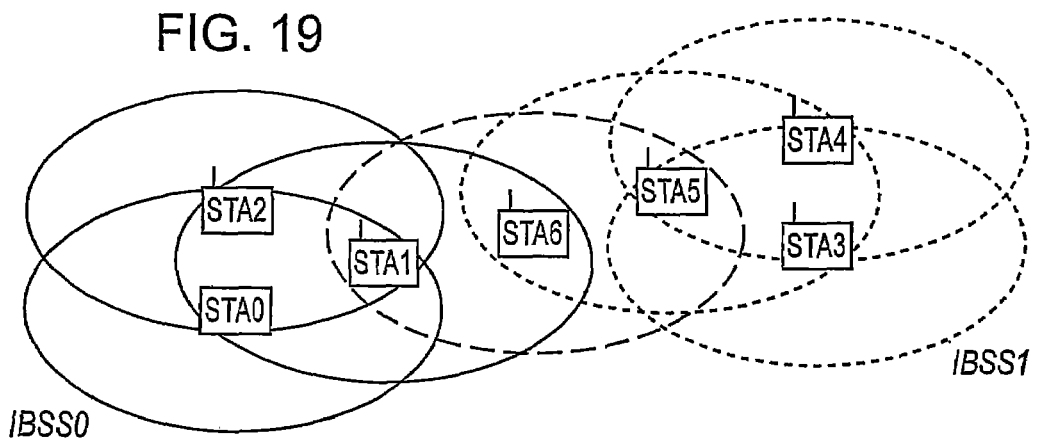
FIG. 19 illustrates a newly participating communication station in the communication environment where a plurality of networks using different communication channels are present.

Since the channel is selected on a per packet basis as described above, an operational flexibility is assured even if a new communication station participates in the communication environment where a plurality of networks using different communication channels as shown in FIG. 19 coexist. As shown in FIG. 19, when station STA6 communicates with station STA1, a communication channel for use in IBSS0 is used, and when station STA6 communicates with station STA5, a communication channel for use in IBSS1 is used. In this way, station STA6 communicates with each of stations STA1 and STA5 without modifying the channel of the other communication channels.

With a plurality of communication channels used, each communication station can communicate with communication stations of the number above the maximum number of communication stations determined by transmission frame period and the minimum beacon interval. However, the number of beacons receivable within one transmission frame equals the maximum number of communication stations per communication channel, and this limitation remains unchanged from the known art.

To select the beacon channel and the data packet channel, the communication station needs to learn the usage status (availability of the band) of each communication channel, namely, needs to perform a scan operation. The scan method to learn the channel usage status is described below.

The preamble detector of the present embodiment discussed with reference to FIGS. 3, 7, 8 and 9 is used. The preamble detector scans all communication channels to detect the channel usage status. If packets overlap each other in time sequence, only a packet that has arrived earlier is received. Depending on information to be acquired, the scan operation is performed in one of the following two methods.

In a first method, the scan operation is performed on a per communication channel basis. The preamble detector is changed from transmission frame period to transmission frame period to scan a single channel. By scanning over the transmission frame periods corresponding to the number of communication channels, the usage status of all communication channels are learned. Although scanning all communication channels takes a relatively long time, all packets are received, and detailed usage status information, such as information contained in the beacon and the address of each packet, is learned. This scan method is used to reserve a packet, examine a variation in the network configuration, and acquire beacon information.

In a second scan method, a scan operation is performed to detect only the preamble. The slot position and channel of the detected preamble are stored in a table of slot by the number of channels. In this method, a scan operation within a single transmission frame period detects the packet positions of all channels and the number of channels. Since packets of a plurality of channels are not concurrently demodulated, the beacon information cannot be acquired. This scan method is used to detect the number of packets per channel and measure the amount of interference in a simple way.

Each communication station may use the two scan methods in combination. For example, the second scan operation is performed at a high frequency, and the first scan operation is performed at a low frequency between intervals of the first scan operation.

If the limitation that a plurality of beacons should not be transmitted within the same slot is observed, the scan operation is performed for one frame because beacons of different channels do not overlap in time sequence.

A method of reducing the amount of interference from the other communication station using dynamic channel reassignment is described below.

Figure 14A:
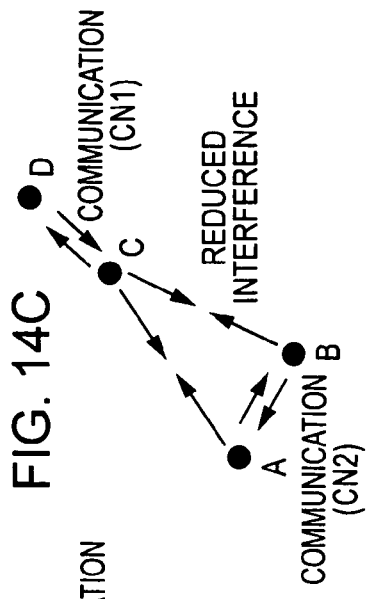
FIGS. 14A-14C illustrate how interference between communication stations is controlled using channel reassignment.
Figure 14B:
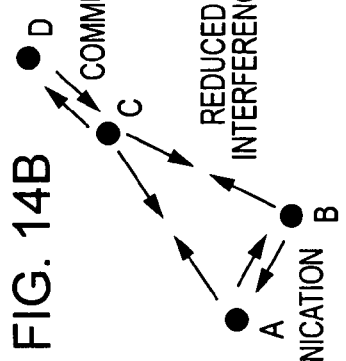

FIGS. 14A-14B diagrammatically illustrate how the interference between the communication stations is reduced by performing channel reassignment. As shown, four communication stations A, B, C, and D are included in the network. Station A communicates with station B, and station C communicates with station D. Station C transmits stream of moving images to station D. The communication channel is now occupied by the transmission of station C. If stations A, B, and C are near enough to interfere with each other, stations A and B may fail to satisfy the required reception SINR levels, thereby being unable to communicate with each other as shown in FIG. 14A.

A range to a communication partner (namely, received power) is measured, and a method of transmitting a packet with a minimum power satisfying the required SINR level is studied. In other words, transmit power control (TPC) is performed. Another technique is also being studied to adjust the threshold value in the detection of the preamble to detect a desired packet only with a preamble of an interfering packet left undetected. This technique is referred to as a preamble detection threshold adjustment technique. These techniques satisfy the SINR requirements more easily, thereby making communications between station A and station B feasible (see FIG. 14B).

If the SINR level between each of stations A and B and station C is equal to or less than the SINR level between station A and station B and the SINR level between station C and station D, the SINR requirements cannot be satisfied even if the TPC and the preamble detection threshold adjustment technique are performed. In such a case, channel switching must be performed. If station A and station B has already communicated with many other communication stations (not shown), all communication channels must be switched. Negotiation involved in channel switching leads to otherwise unnecessary steps. Even if station A attempts to start communicating with station B, communications cannot be established because channel switching cannot be performed.

Figure 14C:
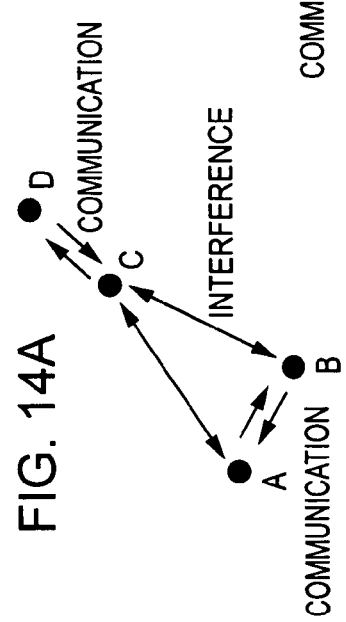
Figure 15:
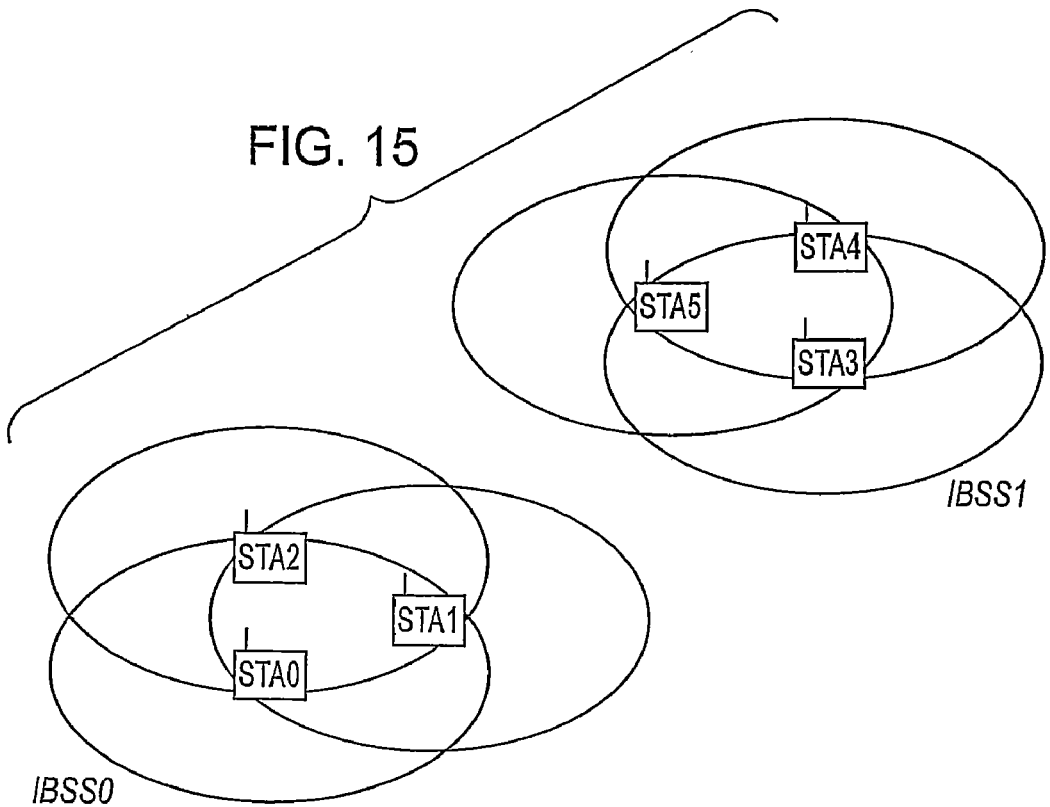
FIG. 15 illustrates the structure of an autonomous distributed radio communication system.
Figure 16:
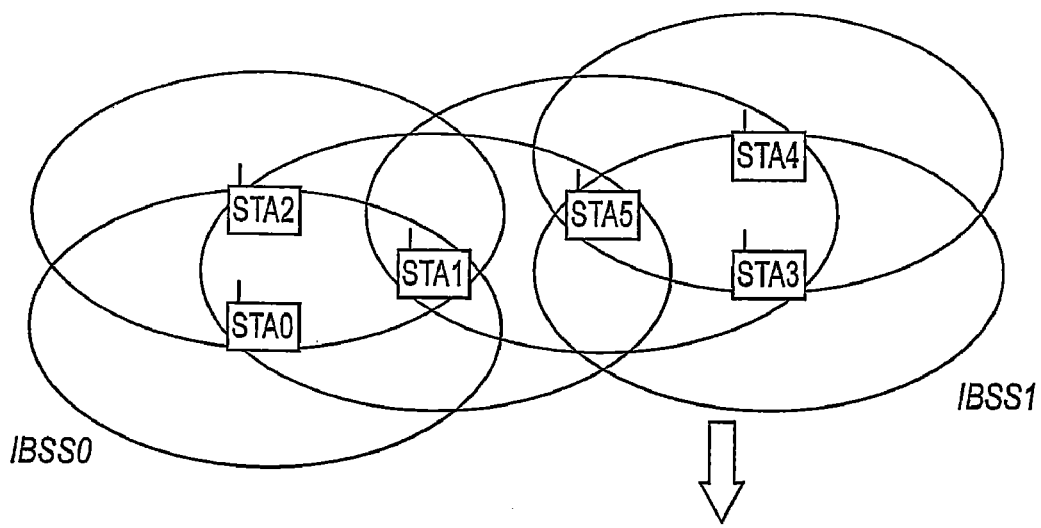
FIG. 16 illustrates the shifting of a network in the autonomous distributed radio communication system.
Figure 17:
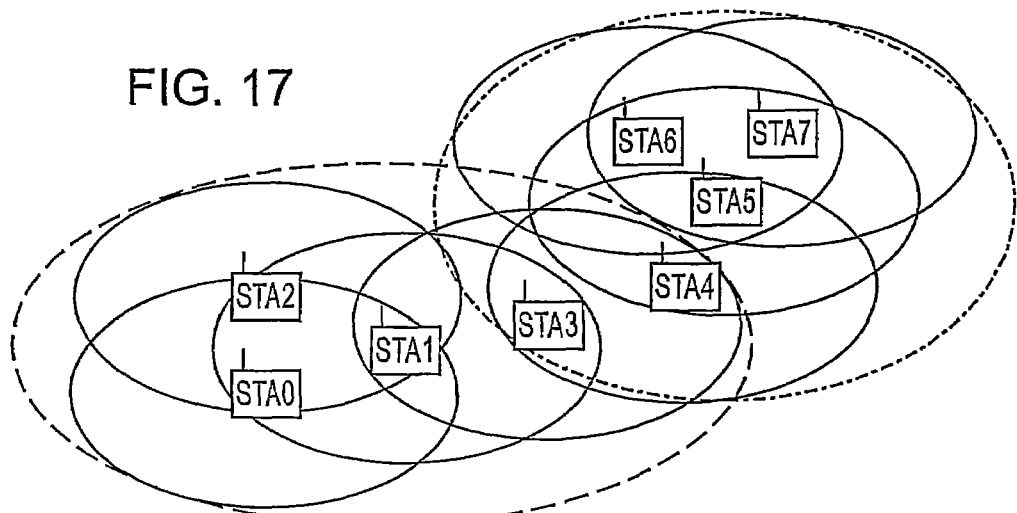
FIG. 17 illustrates an autonomous distributed radio network using a distributed beacon.
Figure 18:
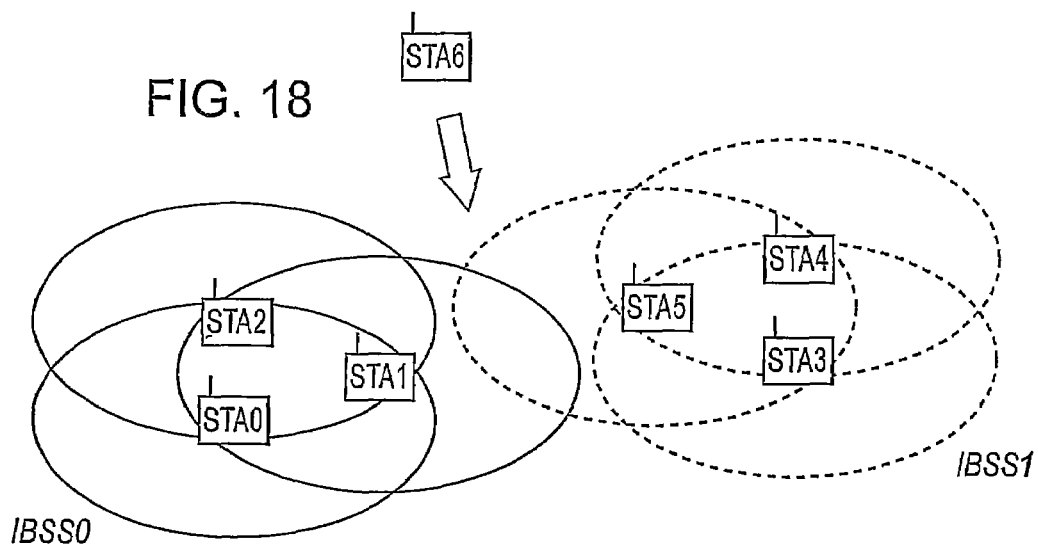
FIG. 18 illustrates networks in coexistence using different communication channels.

A method of channel switching on a per packet basis in accordance with one embodiment of the present invention is thus applied as shown in FIG. 14C. Station A and station B attempt to communicate with each other on the communication channel CN1, but SINR requirements are not satisfied because of communications between station C and station D. In this case, station A and/or station B scans the usage status of each channel to find another less frequently used communication channel CN2 different from the communication channel between station C and station D. After a minimum negotiation is performed between station A and station B, station A and station B switch to the communication channel CN2. Even if each of station A and station B has communicated with other communication stations (for example, station A communicates with station C), switching of the communication channel for that communication is not necessary. Since interference can occur between different channels, a channel having required number of empty slots and having less amount of interference needs to be selected.

It should be understood by those skilled in the art that various modifications, combinations, sub-combinations and alterations may occur depending on design requirements and other factors insofar as they are within the scope of the appended claims or the equivalents thereof.

What is claimed is:

1. A radio communication apparatus for performing radio communications in a communication environment having a plurality of available communication channels, the radio communication apparatus comprising:

packet receiving means for receiving a packet in at least one orthogonally separated channel, the packet including a preamble part on a predetermined channel, and a data part, said preamble part including identification information describing an assignment of a communication channel on which the data part is transmitted, wherein the packet receiving means detects a hopping pattern or a spread code from the identification information, uses the hopping pattern or the spread code detected from the identification information to determine the communication channel on which the data part of the packet is transmitted, and sums, in the one orthogonally separated channel, correlation values between a preamble pattern of each symbol and a spread code in the preamble part to separate the communication channels; and communication channel setting means for setting communication channels for packet transmission of the packet and packet reception of the packet by the receiving means, wherein the communication channel setting means dynamically assigns the communication channel to the packet on a per packet basis during the packet transmission and keeps, during the packet reception, track of the communication channel that is switched on a per packet basis.

2. The radio communication apparatus according to claim 1, further comprising:

beacon generating means for generating a beacon signal containing information relating to the communication environment; and beacon analyzing means for analyzing the beacon signal received from a nearby station,
wherein the communication channel setting means individually assigns the communication channel for use in the packet transmission independent of a communication channel for transmitting the beacon signal.

3. The radio communication apparatus according to claim 1, further comprising:
packet transmitting means for transmitting the packet, wherein the packet transmitting means includes the identification information of the communication channel, set by the communication channel setting means, in the preamble part of the packet, and wherein the packet receiving means detects the preamble part and keeps track of a change of the communication channel on a per packet basis based on preamble part detection results.

4. The radio communication apparatus according to claim 3, further comprising a plurality of preamble detectors configured to detect the preamble part corresponding to each communication channel, wherein the packet receiving means causes the preamble detectors to operate in parallel, and initiates a packet receiving operation in a communication channel corresponding to the preamble part that has been detected first.

5. The radio communication apparatus according to claim 1, wherein a plurality of communication channels separated by a difference between spread codes in the same frequency band are used in the communication environment,
wherein the packet receiving means determines in parallel a correlation value of the spread codes corresponding to the communication channels, and detects the preamble part of the packet based on the comparison of the correlation values with a threshold value, and
wherein the communication channel setting means determines the communication channel assigned to the received packet, based on the preamble part detection results.

6. The radio communication apparatus according to claim 1, further comprising:
packet transmitting means for transmitting the packet,
wherein the communication environment includes a control channel for transmitting the preamble part of the packet in a single frequency band and data channels for transmitting the data part of the packet formed of a plurality of frequency channels, separated by a difference between frequency bands,
wherein the packet transmitting means transmits the data part of the packet in the data channel of a frequency band corresponding to the spread code, said spread code having a one-to-one correspondence to a frequency channel used in the data channel, said communication apparatus transmitting the data part after transmitting, in the control channel, the preamble part using a preamble pattern determined by the spread code, and
wherein the packet receiving means determines, in parallel, a correlation value between the preamble part of the packet in the control channel and the spread code corresponding to the frequency channel, detects the spread code based on a comparison of the correlation value with a threshold value, and receives the data part of the packet in the data channel in a frequency band corresponding to the detected spread code.

7. The radio communication apparatus according to claim 1, wherein the communication channel is defined by the hopping pattern that switches a plurality of usable, orthogonally separated channels every interval equal to one symbol or a plurality of symbols, and wherein a plurality of communication channels are separated by a difference in the hopping patterns of the plurality of orthogonally separated channels.

8. The radio communication apparatus according to claim 7, further comprising:
packet transmitting means for transmitting the packet, wherein the packet transmitting means transmits the preamble part of the packet in a same hopping pattern as the data part.

9. The radio communication apparatus according to claim 7, further comprising:
packet transmitting means for transmitting the packet,
wherein the packet transmitting means transmits, in at least one orthogonally separated channel, a preamble pattern one-to-one corresponding to the hopping pattern, and
wherein the packet receiving means identifies the hopping pattern based on the preamble pattern obtained by receiving the preamble part in the one orthogonally separated channel, and receives a data part of the packet by performing a hopping operation in the identified hopping pattern.

10. The radio communication apparatus according to claim 7, further comprising:
packet transmitting means for transmitting the packet,
wherein the packet transmitting means transmits, in the one orthogonally separated channel, the preamble pattern determined by the spread code one-to-one corresponding to the hopping pattern, and
wherein the packet receiving means determines in parallel a correlation value between the preamble pattern and the spread code corresponding to the hopping pattern, detects the spread code based on a comparison of the correlation value with a threshold value, and receives the data part of the packet in accordance with the hopping pattern corresponding to the detected spread code.

11. The radio communication apparatus according to claim 1, wherein the communication apparatus selects beforehand a communication channel to be used in each direction of communication and notifies a partner communication station of the selected communication channel.

12. The radio communication apparatus according to claim 11, wherein the communication apparatus determines beforehand a communication channel and a frequency band to be used with the partner communication station, and
wherein the packet receiving means detects the preamble part in only the communication channel determined beforehand in the frequency band determined beforehand.

13. The radio communication apparatus according to claim 1, further comprising:
packet transmitting means for transmitting the packet,
wherein the packet transmitting means performs transmission power control to transmit the packet at a minimum power satisfying a predetermined signal to noise/interference ratio, and
wherein the packet receiving means detects only a desired packet by adjusting a threshold value in the detection of the preamble part.

14. A radio communication system including a radio communication apparatus for performing radio communications in a peer-to-peer communication environment having a plurality of available communication channels, comprising:
a packet transmitter configured to transmit a packet including a preamble part transmitted on a predetermined channel, and a data part, said preamble part including identification information describing an assignment of the communication channel on which the data part is transmitted, wherein the radio communication apparatus includes,
- a packet receiver configured to receive the packet, wherein the packet receiver is further configured to detect a hopping pattern or a spread code from the identification information, to use the hopping pattern or the spread code detected from the identification information to determine the communication channel on which the data part of the packet is transmitted, and to sum, in the one orthogonally separated channel, correlation values between a preamble pattern of each symbol and a spread code in the preamble part to separate the communication channels, and
- a communication channel setter configured to set communication channels for packet transmission of the packet transmitter and packet reception of the packet receiver, wherein the communication channel setter is configured to dynamically assign the communication channel to the packet on a per packet basis during the packet transmission and to keep, during the packet reception, track of the communication channel that is switched on a per packet basis.

15. A method implemented by a radio communication apparatus for performing radio communications in a communication environment having a plurality of available communication channels, the method comprising:

- receiving, at the radio communication apparatus, a packet in at least one orthogonally separated channel, the packet including a preamble part on a predetermined channel, and a data part, said preamble part including identification information describing an assignment of a communication channel on which the data part is transmitted;
- detecting, at the radio communication apparatus, a hopping pattern or a spread code from the identification information;
- using, at the radio communication apparatus, the hopping pattern or the spread code detected from the identification information to determine the communication channel on which the data part of the packet is transmitted;
- summing, at the radio communication apparatus, in the one orthogonally separated channel, correlation values between a preamble pattern of each symbol and a spread code in the preamble part to separate the communication channels; and
- setting, at the radio communication apparatus, communication channels for packet transmission by dynamically assigning the communication channel to the packet on a per packet basis during the packet transmission and keeping, during the packet reception, track of the communication channel that is switched on a per packet basis.

* * * * *